(12) United States Patent
Nakagawa et al.

(10) Patent No.: US 8,570,143 B2
(45) Date of Patent: *Oct. 29, 2013

(54) MANAGEMENT SYSTEM

(75) Inventors: Hisashi Nakagawa, Tokyo-to (JP);
Takehiko Anegawa, Tokyo-to (JP);
Yoshihiro Yano, Tokyo-to (JP);
Takayuki Chikada, Tokyo-to (JP)

(73) Assignee: Dai Nippon Printing Co., Ltd.,
Tokyo-to (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/974,411

(22) Filed: Dec. 21, 2010

(65) Prior Publication Data
US 2011/0093928 A1    Apr. 21, 2011

Related U.S. Application Data

(62) Division of application No. 11/718,257, filed as application No. PCT/JP2005/020131 on Nov. 1, 2005.

(30) Foreign Application Priority Data

Nov. 2, 2004  (JP) .................................. 2004-319652

(51) Int. Cl.
*G05B 19/00*    (2006.01)

(52) U.S. Cl.
USPC ....... 340/5.61; 340/10.1; 340/10.2; 340/10.3; 340/10.4; 340/5.7; 726/4

(58) Field of Classification Search
USPC ............. 340/5.61, 10.1, 10.2, 10.3, 10.4, 5.7; 726/4
See application file for complete search history.

(56) References Cited

U.S. PATENT DOCUMENTS 5,414,624 A  *  5/1995  Anthonyson ..................... 701/1
5,682,142 A      10/1997  Loosmore et al.
(Continued)

FOREIGN PATENT DOCUMENTS

JP    11-041352 A    2/1999
JP    2002-197500 A  7/2002
(Continued)

OTHER PUBLICATIONS

USPTO OA mailed Feb. 1, 2011 in connection with U.S. Appl. No. 11/718,257.

(Continued)

*Primary Examiner* — Benjamin C Lee
*Assistant Examiner* — Quang D Pham
(74) *Attorney, Agent, or Firm* — Ladas & Parry LLP

(57) ABSTRACT

A management system manages use of management object provided in facilities by using an information storage medium of a user. An entrance management apparatus, provided in the vicinity of an entrance of the facilities, stores use permission information for permitting the use of the management object on an information storage medium when the user enters the facilities. In the facilities, a use management apparatus, provided for each management object, controls availability or unavailability of the management object based on the use permission information stored on the information storage medium. Additionally, the use management apparatus stores, in the information storage medium, use information showing that the management object is used. Further, a room leaving management apparatus, provided in the vicinity of an exit of the facilities, manages leaving of the user based on the use information stored on the information storage medium. When the user leaves the facilities, it is controlled whether or not the user can leave the facilities, and use history information is stored, based on the use information.

3 Claims, 26 Drawing Sheets

(56) References Cited

U.S. PATENT DOCUMENTS

| | | | |
|---|---|---|---|
| 5,831,533 A | 11/1998 | Kanno | |
| 5,886,634 A | 3/1999 | Muhme | |
| 5,970,227 A | 10/1999 | Dayan et al. | |
| 6,064,316 A * | 5/2000 | Glick et al. | 340/5.65 |
| 6,232,877 B1 | 5/2001 | Ashwin | |
| 6,300,872 B1 | 10/2001 | Mathias et al. | |
| 6,351,813 B1 * | 2/2002 | Mooney et al. | 713/185 |
| 6,720,861 B1 | 4/2004 | Rodenbeck et al. | |
| 6,724,296 B1 * | 4/2004 | Hikita et al. | 340/5.61 |
| 6,747,564 B1 | 6/2004 | Mimura et al. | |
| 6,774,782 B2 | 8/2004 | Runyon et al. | |
| 6,961,000 B2 * | 11/2005 | Chung | 340/572.1 |
| 6,989,749 B2 | 1/2006 | Mohr | |
| 7,123,126 B2 * | 10/2006 | Tanaka et al. | 340/5.2 |
| 7,173,532 B2 * | 2/2007 | Hanle et al. | 340/573.1 |
| 7,183,894 B2 * | 2/2007 | Yui et al. | 340/5.7 |
| 7,196,610 B2 | 3/2007 | Straumann et al. | |
| 7,202,773 B1 * | 4/2007 | Oba et al. | 340/5.8 |
| 7,613,922 B2 * | 11/2009 | Yui et al. | 713/168 |
| 8,102,240 B2 * | 1/2012 | Birchbauer et al. | 340/5.61 |
| 2001/0013827 A1 | 8/2001 | Kawano | |
| 2001/0037310 A1 * | 11/2001 | Saeki | 705/64 |
| 2002/0145505 A1 * | 10/2002 | Sata | 340/5.2 |
| 2003/0005326 A1 | 1/2003 | Flemming | |
| 2003/0025589 A1 * | 2/2003 | Koike | 340/5.25 |
| 2003/0081746 A1 * | 5/2003 | Ahlstrom et al. | 379/102.06 |
| 2003/0163522 A1 * | 8/2003 | Nakamura et al. | 709/203 |
| 2004/0073439 A1 * | 4/2004 | Shuster | 705/1 |
| 2004/0104806 A1 * | 6/2004 | Yui et al. | 340/5.74 |
| 2004/0142741 A1 * | 7/2004 | Walker et al. | 463/20 |
| 2004/0195325 A1 * | 10/2004 | Kogawa | 235/451 |
| 2004/0215474 A1 * | 10/2004 | Nelson et al. | 705/1 |
| 2005/0015630 A1 * | 1/2005 | Yumoto et al. | 713/202 |
| 2005/0052275 A1 * | 3/2005 | Houle | 340/5.61 |
| 2006/0117186 A1 * | 6/2006 | Yeo | 713/182 |
| 2007/0078782 A1 * | 4/2007 | Ono et al. | 705/67 |
| 2008/0195637 A1 * | 8/2008 | Anegawa et al. | 707/100 |
| 2009/0027496 A1 * | 1/2009 | Anegawa et al. | 348/143 |
| 2009/0031397 A1 * | 1/2009 | Chikada | 726/2 |
| 2009/0158410 A1 * | 6/2009 | Yasuda | 726/7 |
| 2010/0073134 A1 * | 3/2010 | Chikada | 340/5.86 |
| 2013/0037612 A1 * | 2/2013 | Matsuo | 235/380 |

FOREIGN PATENT DOCUMENTS

| | | | |
|---|---|---|---|
| JP | 2002197500 A * | 7/2002 | |
| JP | 2003-030155 A | 1/2003 | |
| JP | 2003-187284 A | 7/2003 | |
| JP | 2004-013372 A | 1/2004 | |
| JP | 2004-070542 A | 3/2004 | |
| JP | 2004070542 A * | 3/2004 | |

OTHER PUBLICATIONS

J. Michael Smith, et al; "Integrating Physical and Computer Access Control Systems", Security Technology, 1993 Security Technology, Proceedings, Institute of Electrical and Electronics Engineers 1993 International Carnahan Conference on Ottawa, Ont., Canada Oct. 13-15, 1993, New York, NY, USA, IEEE, Oct. 12, 1994, pp. 176-179, XP010146508, ISBN: 978-0-7803-1479-5 the whole document.
USPTO OA mailed Jun. 17, 2010 in connection with U.S. Appl. No. 11/718,257.
European Search Report: EP 05 80 5484.
International Search Report: PCT/JP2005/020131.

* cited by examiner

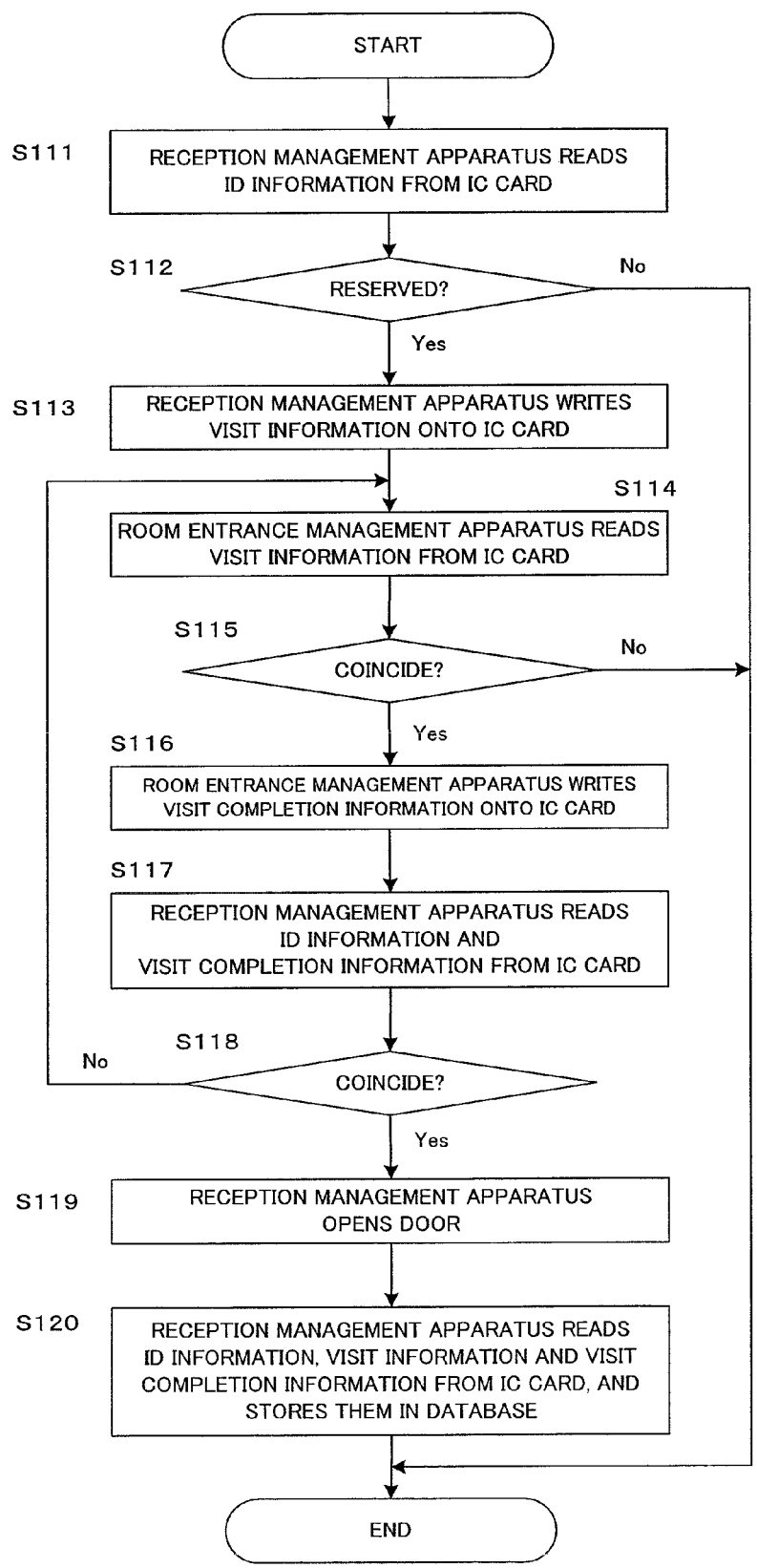

MANAGEMENT SYSTEM

TECHNICAL FIELD

This invention relates to a management system for managing use of a management object such as electronics and equipment provided in a room of facilities with managed entry.

BACKGROUND TECHNIQUE

Conventionally, as a security technique for preventing illegal use of a computer by a third person having no use right, there is known a technique of using an information storage medium such as an IC card. As an example, when a computer is used, ID information is read from an information storage medium such as an IC card on which the ID information for identity certification is stored, and the identity certification is executed by a collation process on the basis of the read ID information. When the identity certification is approved, the computer can be used (e.g., see Patent References-1 and 2).

In this security technique, based on the ID information stored on the information storage medium such as the IC card at the time of using of the computer, the certification process of checking the person's identity is executed. However, when the information storage medium is forged, the third person can illegally steal into the room in which the electronics such as the computer are provided via a position such as a window and a backdoor, other than an official entrance with managed entry. Then, he or she can illegally use the computer by using the forged information storage media. In this case, the third person can dangerously do illegal action, e.g., stealing confidential data stored in the computer, breaking storage data and making the falsification of the storage data.

Namely, when the identity certification is approved, the identified person can normally use the electronics such as the computer. Since there are recently a lot of forged card problems, a new technique for enhancing the security of the electronics becomes necessary.

Recently, for the purpose of the security management, there is known such a system that the third person other than the person with entry right cannot enter the room by executing the identity certification based on the ID information stored on the ID card at the time of entering of the room. However, when the person with the entry right opens the door, the third person, pretending to be the person with the entry right, can dangerously enter the room and use the forged information storage medium to illegally use the computer.

Namely, even when the entrance management is executed from the entrance of the room provided with the electronics such as the computer, or even when the electronics such as the computer provided in the room execute the collation process of the ID information by the information storage medium such as the IC card in order to systematically restrict the user, there is still such a danger that the third person skillfully sneaks through the security technique and illegally uses the electronics to illegally operate and steal the data and make the falsification of the data.

In addition, a personal computer (PC) provided in a company is normally connected to a network such as the Internet, and the PC user can freely access the network. Hence, when the user uses the PC for the purpose of simple paperwork and word-processing process, he or she does not have to access the network. However, in this case, the PC user can freely access the network and browse the information which is not related to his or her original work to execute processing during working. Therefore, it is problematic that the access management to the network cannot be sufficiently executed.

Patent Reference-1: Japanese Patent Application Laid-open under No. 2003-30155
Patent Reference-2: Japanese Patent Application Laid-open under No. 2004-70542

DISCLOSURE OF INVENTION

It is an object of this invention to provide a management system for preventing a management object such as electronics and equipment provided in facilities with managed entry from being illegally used by a third person having no proper use right without conforming to predetermined proper process, route or a using place of the management object.

According to one aspect of the present invention, there is provided a management system which uses an information storage medium of a user to manage use of a management object provided in facilities, comprising: an entrance management apparatus, provided in a vicinity of an entrance of the facilities, which stores use permission information for permitting the use of the management object onto the information storage medium when the user enters the facilities; a use management apparatus, provided in each management object, which controls availability or unavailability of the management object based on the use permission information stored on the information storage medium, and which stores, on the information storage medium, use information showing that the management object is used; and a leaving management apparatus, provided in a vicinity of an exit of the facilities, which manages leaving of the user based on the use information stored on the information storage medium when the user leaves the facilities.

The above management system manages the use of the electronics and equipment provided in the facilities and prevents the illegal use. The facilities are a building, a floor thereof and a room thereof, for example. In addition, the management object is electronics such as a PC and a printer, a time recorder having an electronics control function, equipments such as a cabinet and a locker, and the room inside the building. In this system, the user has the information storage medium and reads and writes necessary information by using the information storage medium. Thereby, the use of the management object is managed. As the information storage medium, a medium capable of reading and writing the information, e.g., the IC card, is used.

Concretely, in the system, the entrance management apparatus is provided in the vicinity of the entrance of the facilities, and the leaving management apparatus is provided in the vicinity of the exit thereof. The exit may be same as the entrance. The entrance management apparatus stores the use permission information on the information storage medium of the user when the user enters the facilities. The use permission information shows the permission of the use of the management object. For example, various kinds of information, such as room entrance information for showing the entering of the user, the use information showing the use of the specific apparatus and equipment by the user, and information showing the room and space entered by the user, can be used as the use permission information.

In the facilities, one or plural management object(s) is(are) provided, and the use management apparatus for managing of the use is provided in each management object. When a certain management object is used, the user makes the use management apparatus read the use permission information from the information storage medium. The use management apparatus controls the availability or unavailability of the management object, based on the use permission information. The control of the availability and unavailability includes releasing of a lock function for using them and presenting the information necessary for the use when the management object is the electronics and equipment. In addition, when the user uses the management object, the use management apparatus stores, on the information storage medium, the use information showing that he or she uses it.

The leaving management apparatus provided in the vicinity of the exit of the facilities manages the leaving of the user, based on the use information stored on the information storage medium. The management of the leaving includes storing of the existence or nonexistence of the leaving, confirming and storing of the use information of the management object at the time of leaving and making the leaving of the user possible or limited.

In this manner, by using the information storage medium of the user, the use of the management object and entering and leaving the facilities are managed. Thereby, it can be prevented that the user without use right and the user who does not follow the appropriate procedure uses the management object.

In a manner of the above management system, identification information of the user may be stored on the information storage medium, and the entrance management apparatus may include: a unit which stores collation identification information, showing a user permitted to enter the facilities; a unit which reads the identification information of the user from the information storage medium; and an entrance control unit which collates the identification information read from the information storage medium with the collation identification information, and enables the user to enter the facilities when they coincide.

In this manner, the identification information of the user is pre-stored on the information storage medium. The entrance management apparatus controls whether or not the user can enter the facilities, based on the identification information of the user. Thus, only the user with the appropriate right can be permitted to enter the facilities.

In another manner of the above management system, the leaving management apparatus may include a storage unit which associates the use information stored on the information storage medium with the identification information of the user to store it. Thereby, use history information of the management object in the facilities can be stored and managed for each user.

In still another manner of the above management system, the leaving management apparatus may include an erasing unit which erases the use permission information and the use information stored on the information storage medium. The use management apparatus may erase the use information stored on the information storage medium after the user uses the management object. Thereby, it can be prevented that the use permission information and the use information is left on the information storage medium and they are illegally used.

In still another manner of the above management system, the use management apparatus may include a control unit which makes the management object unavailable when it is determined that the use permission information stored on the information storage medium does not store information showing availability. Thereby, when the use is not permitted, the use of the management object is prohibited.

In still another manner of the above management system, the facilities may include plural independent spaces, and the entrance management apparatus and the leaving management apparatus may be provided in each of the plural spaces. The entrance management apparatus may store use permission information corresponding to the space on the information storage medium when the user enters the space corresponding to the entrance management apparatus, and the leaving management apparatus may rewrite the use permission information stored on the information storage medium to the use permission information corresponding to a space out of the space when the user leaves the space corresponding to the leaving management apparatus.

Additionally, in a preferred example of the management system, the management object and the use management apparatus corresponding to the management object may be provided in the space, and the use management apparatus may execute control to make the correspondent management object available when the use permission information stored on the information storage medium coincides with the use permission information corresponding to the space.

When the facilities include independent spaces such as plural rooms, the use permission information corresponding to the space is assigned for the management object provided in each space, whenever the user moves, the use permission information corresponding to the space after the movement is stored on the information storage medium. Thereby, even if the user frequently enters and leaves many spaces, the use of each management object can be securely managed.

In still another manner, the management system may include the plural use management apparatuses, and at least one of the use management apparatuses may control the availability or unavailability of the management object managed by said at least one, by prescribing the use information, stored on the information storage medium by another of the use management apparatuses, as the use permission information.

In this manner, when the user simultaneously or continuously uses the plural management objects associated with each other, the use of the other management object can be permitted under condition of the use of the one management object. For example, in such a case that there are a PC and a printer serving as the management objects in the facilities, only when the use information showing that the PC is used is stored on the information storage medium, the PC can be controlled to be used.

In a preferred example of the above control system, the entrance management apparatus may include a time recorder provided in the facilities, and the time recorder may store, on the information storage medium, specifying information of the time recorder as the use permission information, in addition to date and time information. In this example, by using the time recorder normally used in a company, the management of the entering and leaving and the use management of the electronics can be simultaneously executed.

In another preferred example of the above management system, the entrance management apparatus may include a material storage apparatus provided inside or outside the facilities, and may store the use permission information on the information storage medium only when a predetermined material is stored in the material storage apparatus. In this example, when the PC serving as the management object exists in the facilities, the material storage apparatus such as a cabinet and a locker is used in order to take out papers necessary for the work and leave a mobile phone being a prohibited item. Only when the material storage apparatus is appropriately used, the management object such as the PC can be structurally used.

In still another manner of the above management system, the entrance management apparatus may store, on the information storage medium, the use permission information of only a predetermined specific management object of the plural management objects provided in the facilities. In a similar manner, user identification information may be stored on the information storage medium, and the entrance management apparatus may include: a storage unit which stores information of the management object available for the user in correspondence with the use identification information, and a unit which stores, on the information storage medium, the use permission information of the management object corresponding to the use identification information stored on the information storage medium. Thereby, it is prohibited that the user uses the items other than the items predetermined in the plural management objects.

In still another manner of the above management system, the leaving management apparatus may include a unit which prohibits the user from leaving the facilities when the use information is not stored on the information storage medium. Thereby, unless the user uses the management object in accordance with the appropriate procedure and rule, he or she cannot leave the facilities.

In still another manner of the above management system, the leaving management apparatus may include a unit which prohibits the user from leaving the facilities when the use information of all the management objects that the user can use is not stored on the information storage medium. In this manner, unless the user executes all the predetermined work and process, he or she cannot leave the facilities. This system is effective for the purpose of prevention of skipping of items in a health check including items different among the users, for example.

According to another aspect of the present invention, there is provided a management method which manages use of a management object provided in facilities by using an information storage medium of a user, including: a step which stores use permission information for permitting use of the management object on the information storage medium by an entrance management apparatus provided in a vicinity of an entrance of the facilities when the user enters the facilities; a step which controls availability or unavailability of the management object by a use management apparatus provided in each management object based on the use permission information stored on the information storage medium, and stores, on the information storage medium, use information showing that the management object is used; and a step which determines whether or not the user can leave the facilities by a leaving management apparatus provided in a vicinity of an exit of the facilities, based on the use information stored on the information storage medium, when the user leaves the facilities.

BRIEF DESCRIPTION OF THE DRAWINGS

FIG. 29 is a flow chart of the process by the visit management system according to the ninth embodiment.

BRIEF DESCRIPTION OF THE REFERENCE NUMBER

Figure 1:
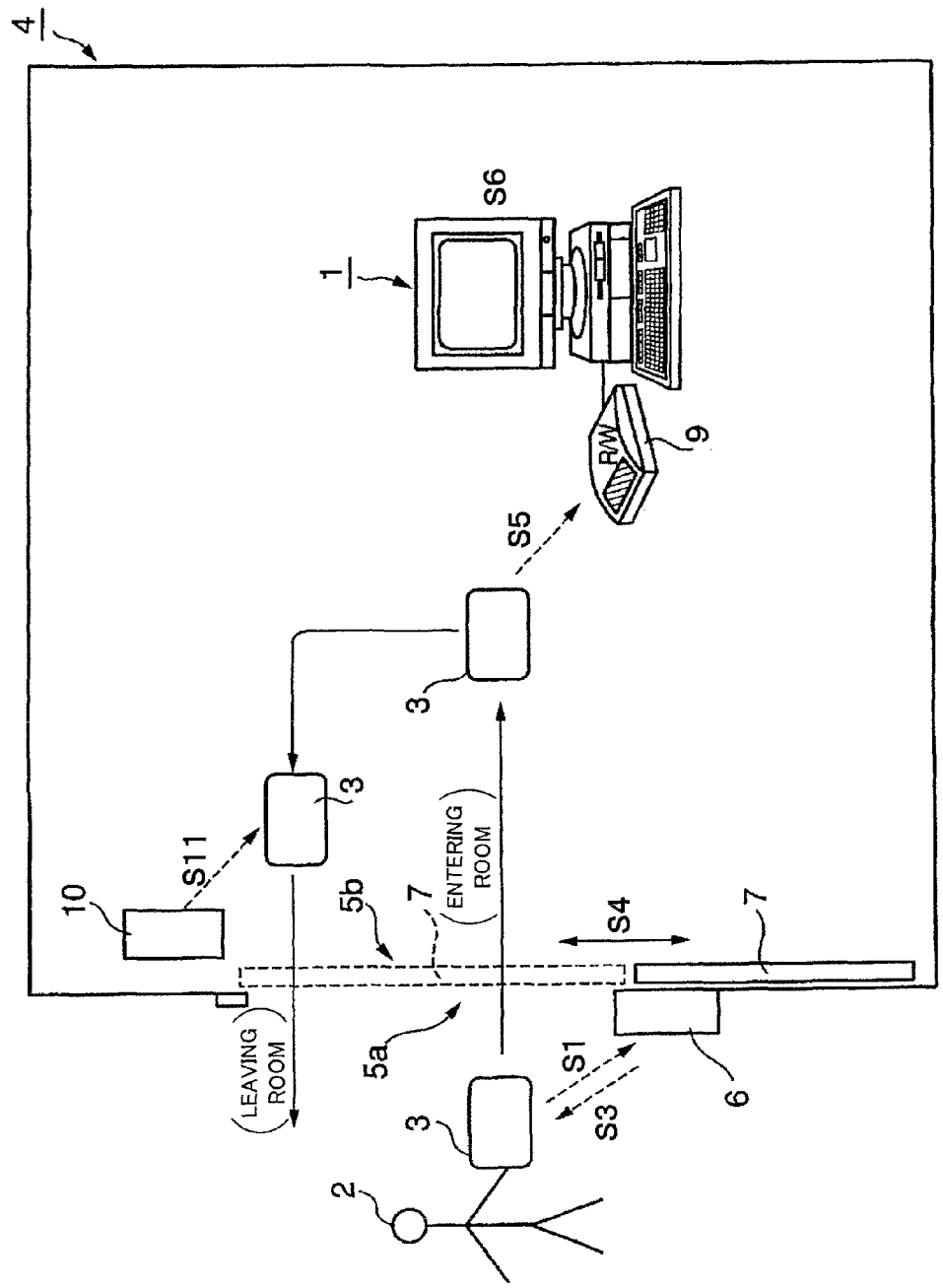
FIG. 1 is a drawing for schematically explaining a use management system of electronics according to a first embodiment.

1 PC
3 Non-contact IC card
4 Room
6 Room entrance management apparatus
9 IC card reader/writer
10 Room leaving management apparatus
34, 143 Printers
160 Time recorder
170, 180 Cabinets

DETAILED DESCRIPTION OF THE PREFERRED EMBODIMENTS

The present invention is to manage the use of the management object provided in the facilities by using the information storage medium. The management object can be managed, even when it is not connected to a communication network. Therefore, when the management object is taken out of the facilities and the room, it is prohibited that the illegal third person uses it. It can be limited that even the legal owner of the information storage medium uses the management object at a place including no security surroundings. Thus, the optimum use management can be realized. Hereinafter, the preferred embodiments of the present invention will be described below with reference to the attached drawings.

[First Embodiment]

A first embodiment is such a case that the present invention is applied to the use management system of the electronics. FIG. 1 schematically shows the use management system of the electronics according to the first embodiment. The facilities in the present invention include a room, a building, a floor in the building, a specific place, a specific area, a specific field and a specific region, for example. In the explanation of the first embodiment, a description will be given of the room including the electronics, as an example.

A user 2 having a use right of a personal computer (PC) 1 being electronics, provided in a room 4, has a non-contact IC card 3 being an information storage medium. A room entrance management apparatus 6 is provided in the vicinity of an entrance 5a of the room 4. Opening/closing state of an automatic door 7 provided at the entrance 5a is controlled by the room entrance management apparatus 6.

The room entrance management apparatus 6, capable of transmitting and receiving information to and from the non-contact IC card 3 by radio, can read the information stored on the non-contact IC card 3 and write the information to the non-contact IC card 3. In addition, an IC card reader/writer 9, provided in the PC 1, can read the information stored on the non-contact IC card 3 and write the information to the non-contact IC card 3.

Further, a room leaving management apparatus 10 is provided in the vicinity of an exit 5b of the room 4, which controls the opening/closing state of the automatic door 7. In addition, the room leaving management apparatus 10, capable of transmitting and receiving the information to and from the non-contact IC card 3 by the radio, can read the information stored on the non-contact IC card 3 and write the information onto the non-contact IC card 3.

In the room 4, the entrance 5a and the exit 5b may be separately provided, and an entrance/exit serving as the entrance 5a and the exit 5b may be provided. FIG. 1 shows such a case that the entrance/exit is provided. Moreover, the room entrance management apparatus 6 and the room leaving management apparatus 10 may be integrated to be provided on a part of a wall separating an outside and an inside of the room.

Figure 2:
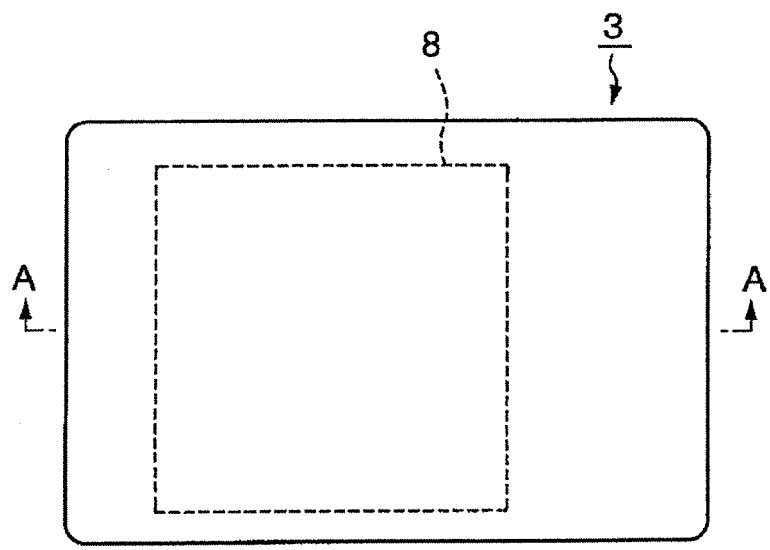
FIG. 2 is a plan view of a non-contact IC card.
Figure 3:
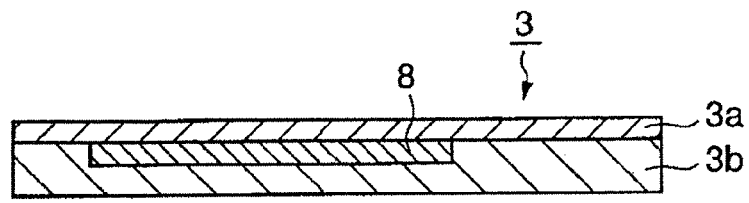
FIG. 3 is a cross-sectional view which is cut by a cutting-line A-A shown in FIG. 2.
Figure 4:
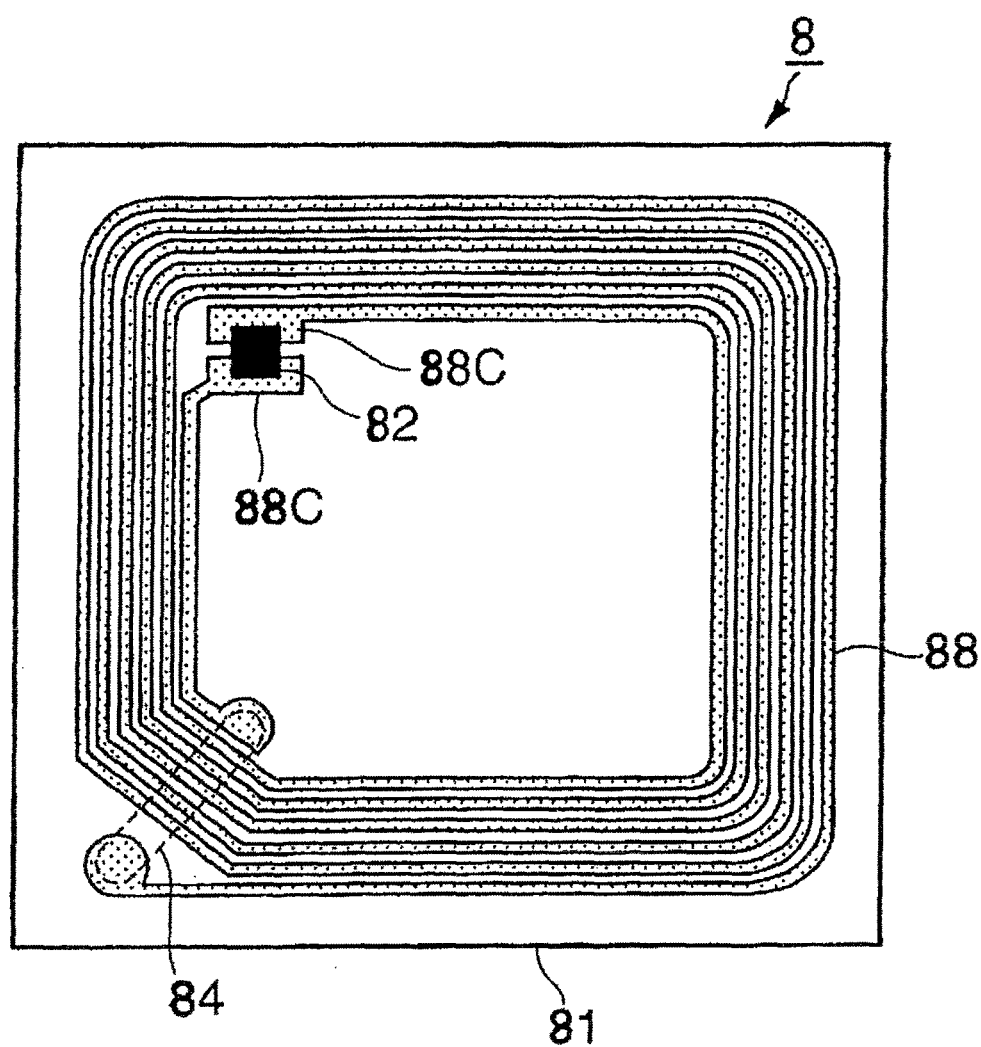
FIG. 4 is a plan view of an IC tag integrated with the non-contact IC card.

The non-contact IC card 3 being the information storage medium has such a configuration that a non-contact IC tag 8 is integrated inside of card base materials 3a and 3b, as shown in FIG. 2 to FIG. 4, for example. The non-contact IC tag 8 is also referred to as "non-contact data carrier" or "RFID", and a transmitting/receiving unit 88 including a coil pattern is formed on a base material 81 made of plastic, as shown in FIG. 4. The non-contact IC tag 8 forms a resonant circuit with using a coil and a capacitative element to receive and transmit an acoustic wave of a constant frequency. Additionally, as another system, power transmission and data transmission may be performed by electromagnetic induction of a carrier wave from the reader/writer. Generally, frequency bands of 135 kHz (medium wave), 13.56 MHz and 2.45 GHz (micro wave) are used.

In the case of the shown example, the transmitting/receiving unit 88 including the coil pattern forms a jumping circuit on the rear side of the base material 81 by a continuity member 84, and is connected to a bump on the rear side of an IC chip 82 by a coil connection terminal 88C. The IC chip 82 includes a control unit 89 serving as a CPU and a storage unit 90 serving as a memory.

In the shown example, the capacitative element is integrated in the IC chip 82. The non-contact IC tag 8 is formed by forming the coil pattern by the photo etching or the etching after resist print of metallic foil such as aluminum foil laminated on a resin base material, mounting the IC chip 82, and providing a protective coating. The size can be a size equal to or smaller than 30 mm×30 mm.

The resin base material 81 used for the non-contact IC tag 8 can be made of various kinds of materials such as PET, polypropylene, polyethylene, polystyrene and nylon. Moreover, the resin base material 81 may be made of paper. Though thickness thereof can be 15-300 µm, 20-100 µm is preferred in consideration of the strength, the processing work property and the cost. Though copper foil, aluminum foil and iron foil can be used as the metallic foil, the aluminum foil is preferred in consideration of the cost and the processing property, and the thickness about 6-50 µm is preferred.

In reading and writing the information stored on the non-contact IC tag 8, the IC card reader/writer 9 sends a resonating calling signal to the non-contact IC tag 8, and receives a response signal from the non-contact IC tag 8 at the distance from several to several tens centimeter. Thereby, the information stored in the memory being the storage unit of the IC chip 82 of the non-contact IC tag 8 can be read, and the information can be written. In addition, the ID information for the identity certification is pre-registered in the memory serving as the storage unit of the IC chip 82.

Figure 5:
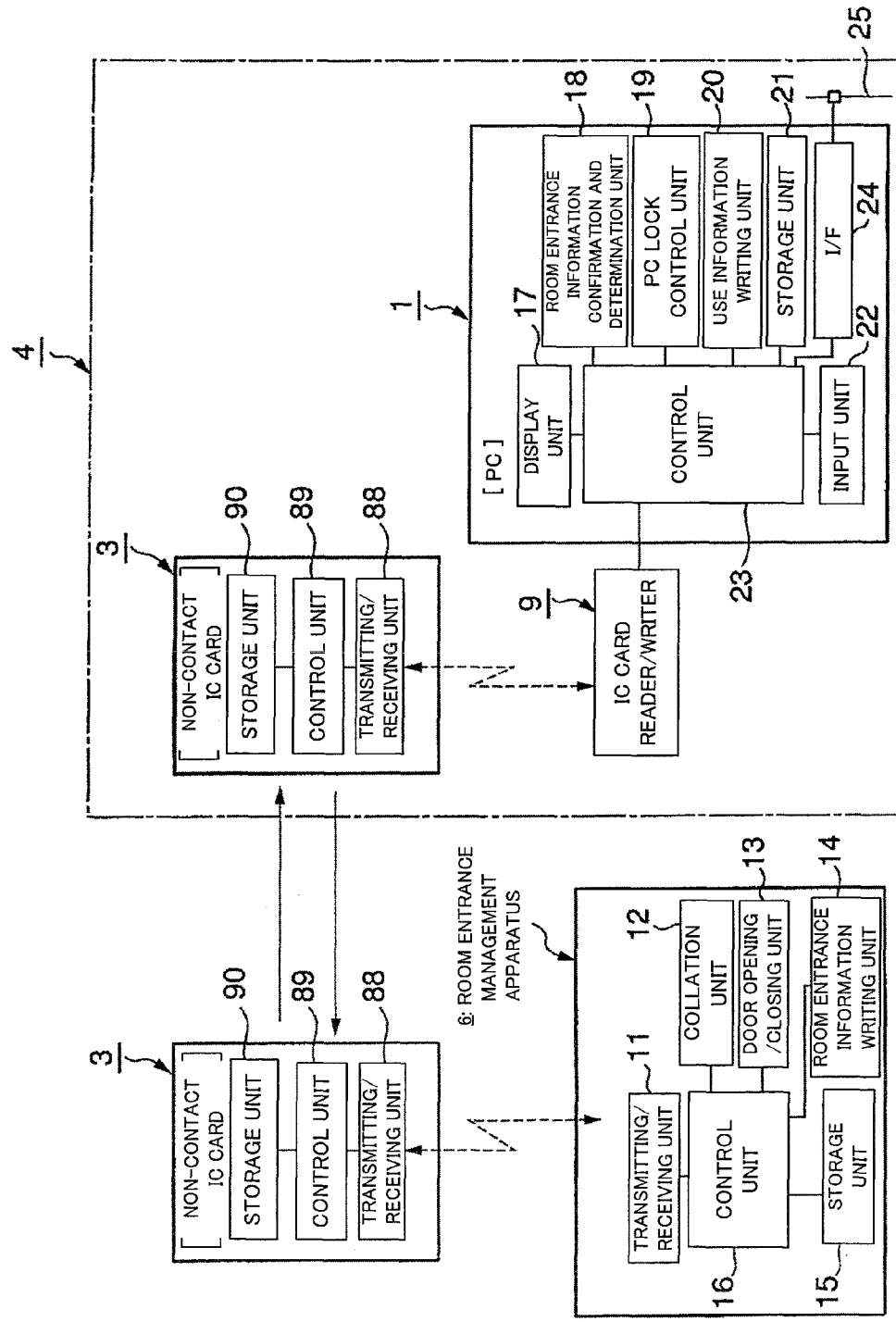
FIG. 5 is a schematic configuration diagram of the use management system of the electronics according to the first embodiment.

Next, a system configuration will be explained in detail, with reference to the functional block diagram shown in FIG. 5. FIG. 5 shows the system configuration including the non-contact IC card 3, the room entrance management apparatus 6, the IC card reader/writer 9 and the PC 1.

The room entrance management apparatus 6 provided in the vicinity of the entrance 5 includes a transmitting/receiving unit 11, a collation unit 12, a door opening/closing unit 13, a room entrance information writing unit 14, a storage unit 15 and a control unit 16. The transmitting/receiving unit 11 transmits and receives the information to and from the transmitting/receiving unit 88 of the non-contact IC card 3 by the radio transmission.

The collation unit 12 collates ID information received from the non-contact IC card 3 and collation ID information pre-stored in the storage unit 15. When they coincide with each other by the collation process of the collation unit 12, the door opening/closing unit 13 opens the automatic door 7. Instead of the ID information, various kinds of information associated with the ID information, other than the ID information, may be stored in the storage unit 15 as the collation information.

When the ID information coincide with each other in the collation process by the collation unit 12, the room entrance information writing unit 14 controls the control unit 16 and transmits the room entrance information to the non-contact IC card 3 from the transmitting/receiving unit 11 of the room entrance management apparatus 6 to write the room entrance information in the storage unit 90 of the non-contact IC card 3.

As the room entrance information written in the storage unit 90 of the non-contact IC card 3 from the room entrance management apparatus 6, various kinds of information can be used. For example, as the room entrance information, predetermined specific information obtained by combining characters and numbers may be used. In this case, various kinds of information, such as a room number, a random number, a predetermined number and a predetermined character string, can be prescribed as the room entrance information.

At the time of entering the room, as room entrance information, a flag may be written into a room entrance flag storage area, which is provided in the storage unit 90 of the non-contact IC card 3. Further, entering the room may be determined by erasing the flag prewritten in the entering flag storage area, at the time of entering of the room. When the above-mentioned flag is used, by writing or erasing the flag into or from the room entrance flag storage area, the information stored in the room entrance flag storage area is changed. Thereby, the writing process of the room entrance information is executed.

The PC 1 includes a display unit 17, a room entrance information confirmation and determination unit 18, a PC lock control unit 19, a use information writing unit 20, a storage unit 21, an input unit 22, a control unit 23 and an interface (I/F) 24. By the interface (I/F) 24, the PC 1 is connected to other electronics such as a printer provided in the room via a LAN 25.

The room entrance information confirmation and determination unit 18 controls the control unit 23 and transmits the signal to the non-contact IC card 3 from the IC card reader/writer 9. In this manner, the room entrance information confirmation and determination unit 18 reads the room entrance information stored in the storage unit 90 of the non-contact IC card 3 and determines whether or not the room entrance information is the proper room entrance information. When the room entrance information stored on the non-contact IC card 3 is about existence or nonexistence of the flag, by determining whether or not the room entrance information is proper on the basis of the existence or nonexistence of the flag, the room entrance information confirmation and determination unit 18 determines whether or not to make the PC available.

When the room entrance information confirmation and determination unit 18 determines that the room entrance information read from the non-contact IC card 3 is proper, the PC lock control unit 19 releases the lock of the PC 1 to make it available. When the use of the PC 1 ends, the PC lock control unit 19 executes the control so that the PC 1 is in the lock state again, i.e., the PC 1 becomes unusable again.

The use information writing unit 20 writes the use information showing the use of the PC 1 in the storage unit 90 of the non-contact IC card 3 via the control unit 23 and the IC card reader/writer 9. As the use information, the predetermined specific information obtained by combining the characters and the numbers can be used. In this case, various kinds of information, such as the management number of the electronics, the random number, the predetermined number and the predetermined character string, can be prescribed as the use information.

At the time of entering of the room, as the use information, the flag can be written into the room entrance flag storage area, which is provided in the storage unit 90 of the non-contact IC card 3. In addition, at the time of entering of the room, by erasing the flag prewritten in the room entrance flag storage area, the use of the electronics can be determined, too. In the case of using the above-mentioned flag, by writing and erasing the flag into and from the room entrance flag storage area, the information stored in the room entrance flag storage area is changed. In this manner, writing of the use information is executed.

Next, a description will be given of a relation between the room leaving management apparatus 10 and the non-contact IC card 3, with reference to a functional block diagram of the room leaving management apparatus 10 shown in FIG. 6.

The room leaving management apparatus 10 includes a transmitting/receiving unit 26, a door opening/closing unit 27, a registration unit 28, a storage unit 29, a room entrance information erasing unit 30, a use information erasing unit 31, a control unit 32 and a PC user information database 33.

The transmitting/receiving unit 26 transmits and receives the information to and from the transmitting/receiving unit 88 of the non-contact IC card 3 by the radio transmission. The door opening/closing unit 27 opens the automatic door at the time of receiving the ID information from the non-contact IC card 3. The registration unit 28 associates the ID information received from the non-contact IC card 3 with the use information to register it to the PC user information database 33.

The room entrance information erasing unit 30 erases the room entrance information stored in the storage unit 90 of the non-contact IC card 3, and makes the environment return to the state of the room before the entering of the user of the PC 1. The use information erasing unit 31 erases the use information stored in the storage unit 90 of the non-contact IC card 3, and makes the environment return to the state of the room before the entering of the user of the PC 1.

In the first embodiment having the above-mentioned configuration, the room 4 corresponds to the facilities, and the room entrance management apparatus 6 serves as the entrance management apparatus. The room leaving management apparatus 10 serves as the leaving management apparatus, and the room entrance information serves as the use permission information. Further, the PC 1 serves as the management object and the use management apparatus.

Next, a description will be given of a process according to the first embodiment of the present invention, with reference to a flow chart shown in FIG. 7.

First, when the user of the PC 1 in the room 4 serving as the facilities in which the entrance is managed enters the room 4 from an entrance thereof, he or she puts the non-contact IC card 3 being the information storage medium close to the room entrance management apparatus 6. At this time, the room entrance management apparatus 6 reads the ID information stored in the storage unit 90 of the non-contact IC card 3 (step S1). The collation unit 12 of the room entrance management apparatus 6 collates the read ID information with the ID information pre-registered in the storage unit 15 of the room entrance management apparatus 6 as collation management information (step S2).

When the ID information coincide with each other in the collation process, the signal for writing the room entrance information is transmitted to the non-contact IC card 3 from the transmitting/receiving unit 11 by the control of the room entrance information writing unit 14 of the room entrance management apparatus 6, and the room entrance information is written into the storage unit of the non-contact IC card 3 (step S3). Substantially simultaneously, the automatic door 7 is opened by the door opening/closing unit 13, and the user can enter the room 4 (step S4).

When the ID information do not coincide with each other in the collation process of the ID information in step S2, the signal for writing the flag being the room entrance information is never transmitted to the non-contact IC card 3 from the room entrance management apparatus 6. Therefore, the automatic door 7 is kept closed, and the user cannot enter the room 4. Then, the process ends.

The user, entering the room 4 from the entrance, puts the non-contact IC card 3 close to the IC card reader/writer 9 included in the PC 1, and the IC card reader/writer 9 reads the room entrance information from the storage unit 90 of the non-contact IC card 3 (step S5) to determine whether or not the flag being the room entrance information is written into the storage unit 90 of the non-contact IC card 3 (step S6).

When it is determined that the room entrance information is written into the storage unit 90 of the non-contact IC card 3, the PC lock control unit 19 releases the start-up lock of the PC 1 to make the PC 1 available (step S7).

Meanwhile, when it is determined that the room entrance information is not written into the storage unit 90 of the non-contact IC card 3, the start-up lock of the PC 1 is never released, and the PC 1 is kept unavailable. Then, the process ends.

When it is determined that the room entrance information is written into the storage unit 90 of the non-contact IC card 3 and the start-up lock of the PC 1 is released by the PC lock control unit 19, the use information is transmitted to the non-contact IC card 3 from the IC card reader/writer 9 by the control of the use information writing unit 20 of the PC 1, and the flag being the use information is written into the use flag storage area of the storage unit 90 of the non-contact IC card 3 (step S8).

Afterwards, when the user 2 leaves the room from the exit, the room leaving management apparatus 10 reads the ID information and the use information stored in the storage unit 90 of the non-contact IC card 3 (step S9). Then, the room leaving management apparatus 10 associates the ID information with the use information to register it in the PC user information database 33 (step S10).

Moreover, the room leaving management apparatus 10 transmits the signal to the non-contact IC card 3, and erases the room entrance information and the use information stored in the storage unit 90 of the non-contact IC card 3. Thereby, the storage unit 90 of the non-contact IC card 3 returns to the state before the room entrance information and the use information are written (step S11).

As described above, in the use management system of the electronics according to the first embodiment of the present invention, it is determined whether or not the room entrance information is stored in the storage unit 90 of the non-contact IC card 3 of the user when the user uses the PC 1 in the room 4 serving as the facilities in which the entrance is managed. When it is determined that the room entrance information is stored, the PC 1 structurally becomes available. Thus, it can be prevented that a person, illegally entering the room through a route other than the predetermined room entrance route, uses the PC.

In the use management system of the electronics according to the first embodiment, the room entrance information erasing unit 28 provided in the room leaving management apparatus 10 may be provided in the PC 1 being the electronics. In such a case that the PC 1 includes the room entrance information erasing unit, it is determined that the room entrance information is written onto the non-contact IC card 3 in step S6, and the start-up lock of the PC 1 is released by the PC lock control unit 19. Subsequently, such a process that the room entrance information of the storage unit 90 of the non-contact IC card 3 is erased may be executed to the non-contact IC card 3 by the PC 1. Thereby, the storage unit 90 of the non-contact IC card 3 returns to the state before the room entrance information is written.

(Modification)

In the above-mentioned embodiment, though such an example that the flag is used as the room entrance information is described, instead of the flag, the information of the character and the number such as the room number may be also used as the room entrance information. For example, when the room number is used as the room entrance information, the room number being the room entrance information is written onto the non-contact IC card 3 from the transmitting/receiving unit 11 by the control of the room entrance information writing unit 14 of the room entrance management apparatus 6. The user who enters the room from the entrance puts the non-contact IC card 3 close to the IC card reader/writer 9 provided in the PC 1, and makes the IC card reader/writer 9 read the room number stored on the non-contact IC card 3 to collate the room number with collation room entrance information pre-stored in the PC 1. When the information coincide with each other, the PC lock control unit 19 releases the start-up lock of the PC 1, and the PC 1 becomes available.

Instead of the room entrance information, the other information associated with the room entrance information may be stored in the PC 1 as the collation information.

[Second Embodiment]

A second embodiment is also such a case that the present invention is applied to the use management system of the electronics. Hereinafter, a description will be given of the use management system of the electronics according to the second embodiment.

Figure 8:
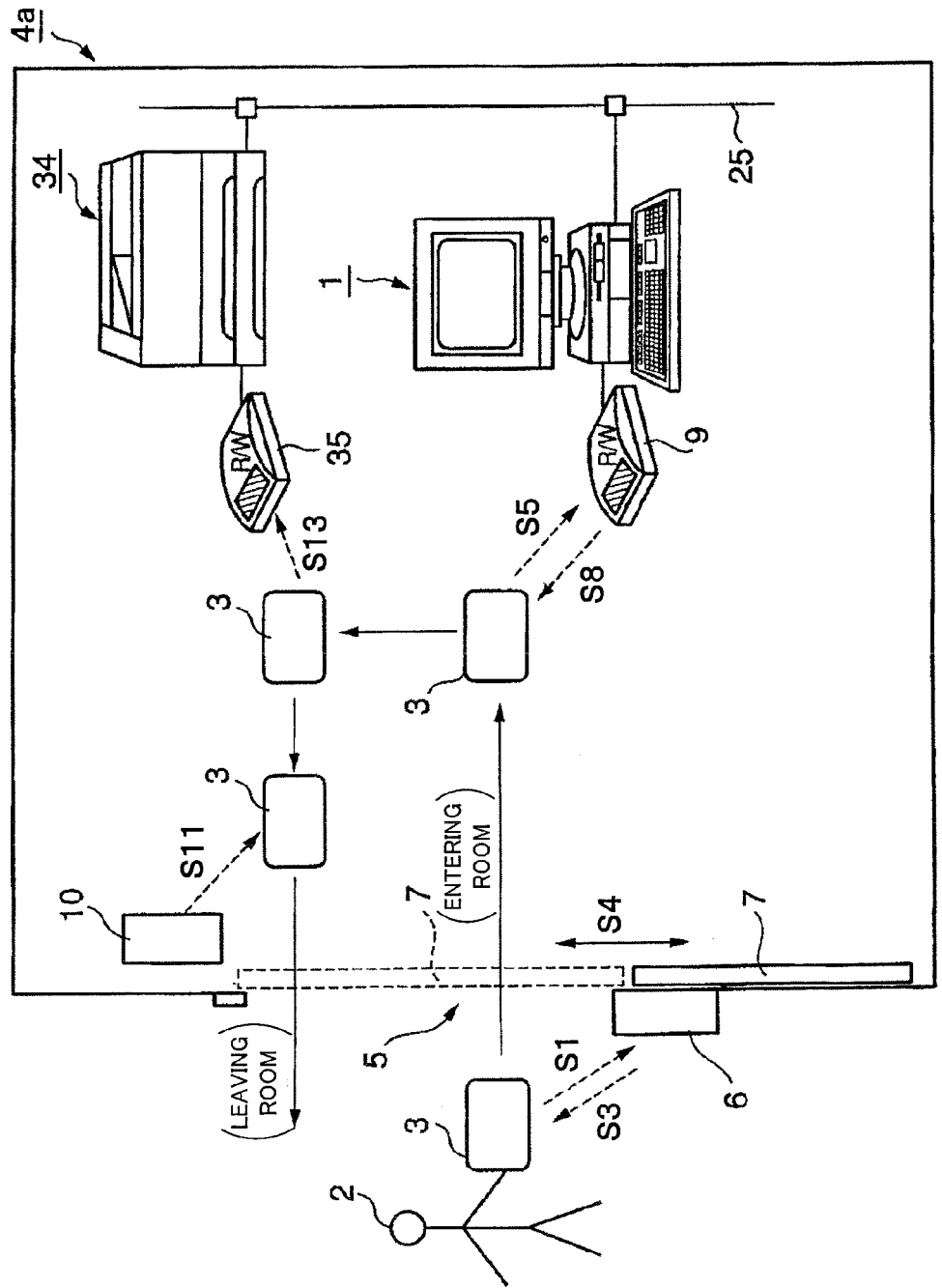
FIG. 8 is a schematic configuration diagram of the use management system of the electronics according to a second embodiment.

In the use management system of the electronics according to the second embodiment, in addition to the PC being the first electronics, a printer 34 being the second electronics is provided in a room 4*a*, as shown in FIG. 8. An IC card reader/writer 35 is provided in the printer 34, which makes it possible to read the information stored on the non-contact IC card 3 and write the information onto the non-contact IC card 3.

Figure 9:
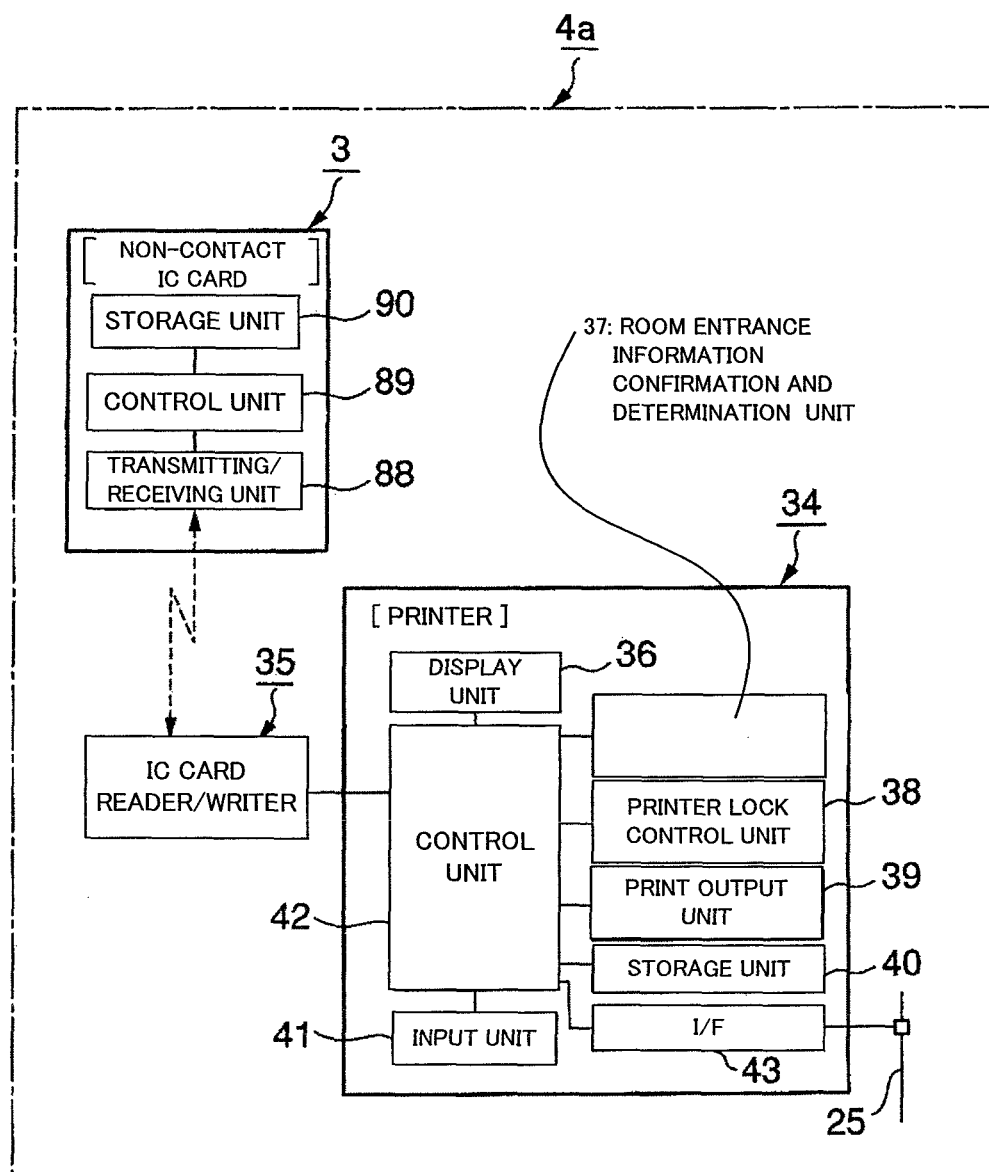
FIG. 9 is a functional block diagram of the use management system of the electronics according to the second embodiment.

FIG. 9 shows a functional block diagram of the printer 34. As shown in FIG. 9, the printer 34 includes a display unit 36, a room entrance information confirmation and determination unit 37, a printer lock control unit 38, a print output unit 39, a storage unit 40, an input unit 41, a control unit 42 and an interface (I/F) 43. The printer 34 is connected to the PC 1 provided in the room 4*a* via the interface (I/F) 43 and the LAN 25. The user of the PC 1 can transmit data for print output to the printer 34 from the PC 1 via the LAN 25 and print it out from the printer 34. The printer 34 is also provided in the room 4*a*, similarly to the PC 1.

The room entrance information confirmation and determination unit 37 transmits the signal to the non-contact IC card 3 from the IC card reader/writer 35, and reads the room entrance information stored in the storage unit 90 of the non-contact IC card 3 to determine whether or not the room entrance information is proper. When the room entrance information stored on the non-contact IC card 3 is about the existence or nonexistence of the flag, the room entrance information confirmation and determination unit 37 determines whether or not the room entrance information is proper based on the existence or nonexistence of the flag, and determines whether or not to make the PC available.

When the room entrance information confirmation and determination unit 37 determines that the room entrance information read from the non-contact IC card 3 is proper, the printer lock control unit 38 executes the control to make the printer 34 available. Namely, the printer lock control unit 38 executes the control and makes it possible for the printer 34 to print out.

In the second embodiment having the above-mentioned configuration, the room 4a corresponds to the facilities, and the room entrance management apparatus 6 serves as the entrance management apparatus. The room leaving management apparatus 10 serves as the leaving management apparatus. Additionally, the room entrance information serves as the use permission information, and the PC 1 and the printer 34 serve as the management object and the use management apparatus.

Figure 10:
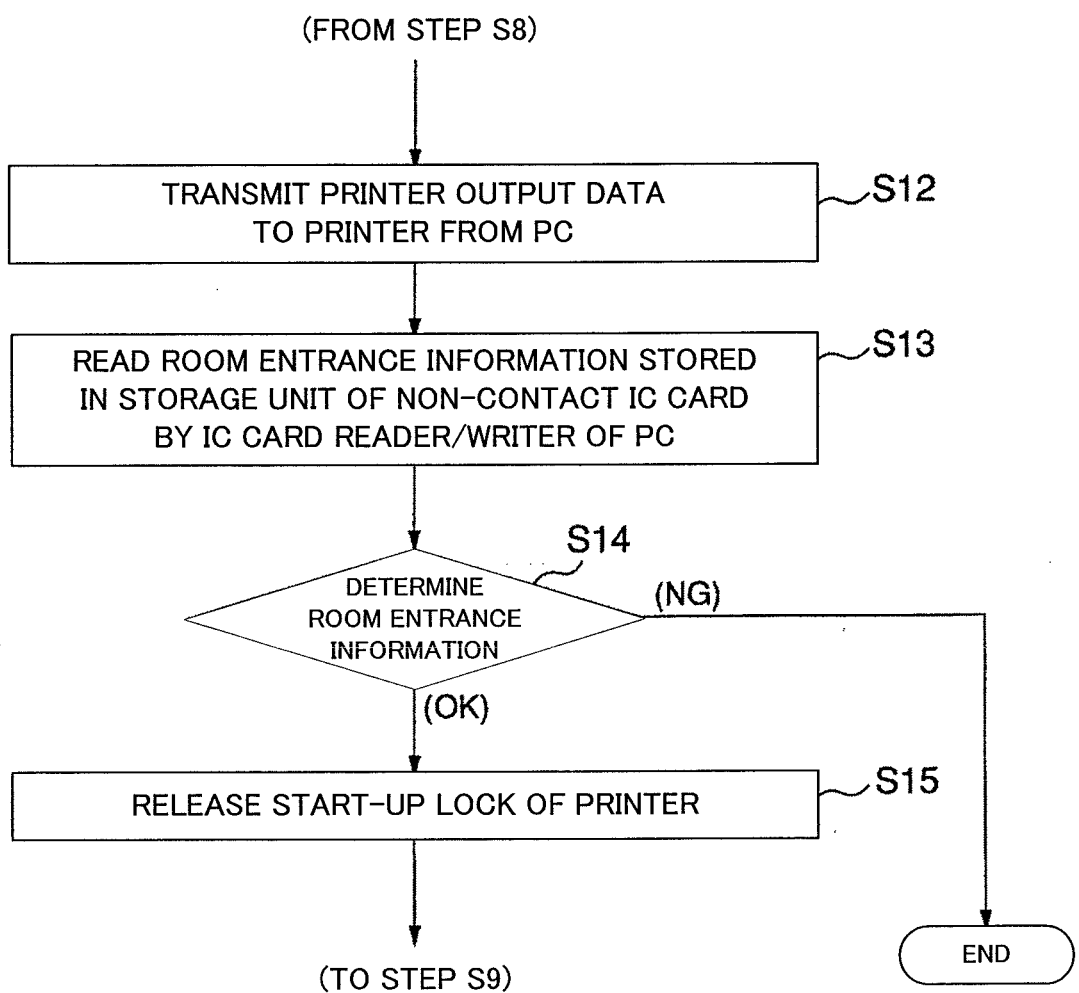
FIG. 10 is a flow chart showing the process by the use management system of the electronics according to the second embodiment.

Next, a process according to the second embodiment will be explained with reference to a flow chart shown in FIG. 10. FIG. 10 shows only apart of the process according to the second embodiment, different from the processing according to the first embodiment shown in FIG. 7. Concretely, the process of the second embodiment is obtained by adding steps S12 to S15 shown in FIG. 10 between steps S8 and S9 in the flow chart of the first embodiment shown in FIG. 7.

Figure 7:
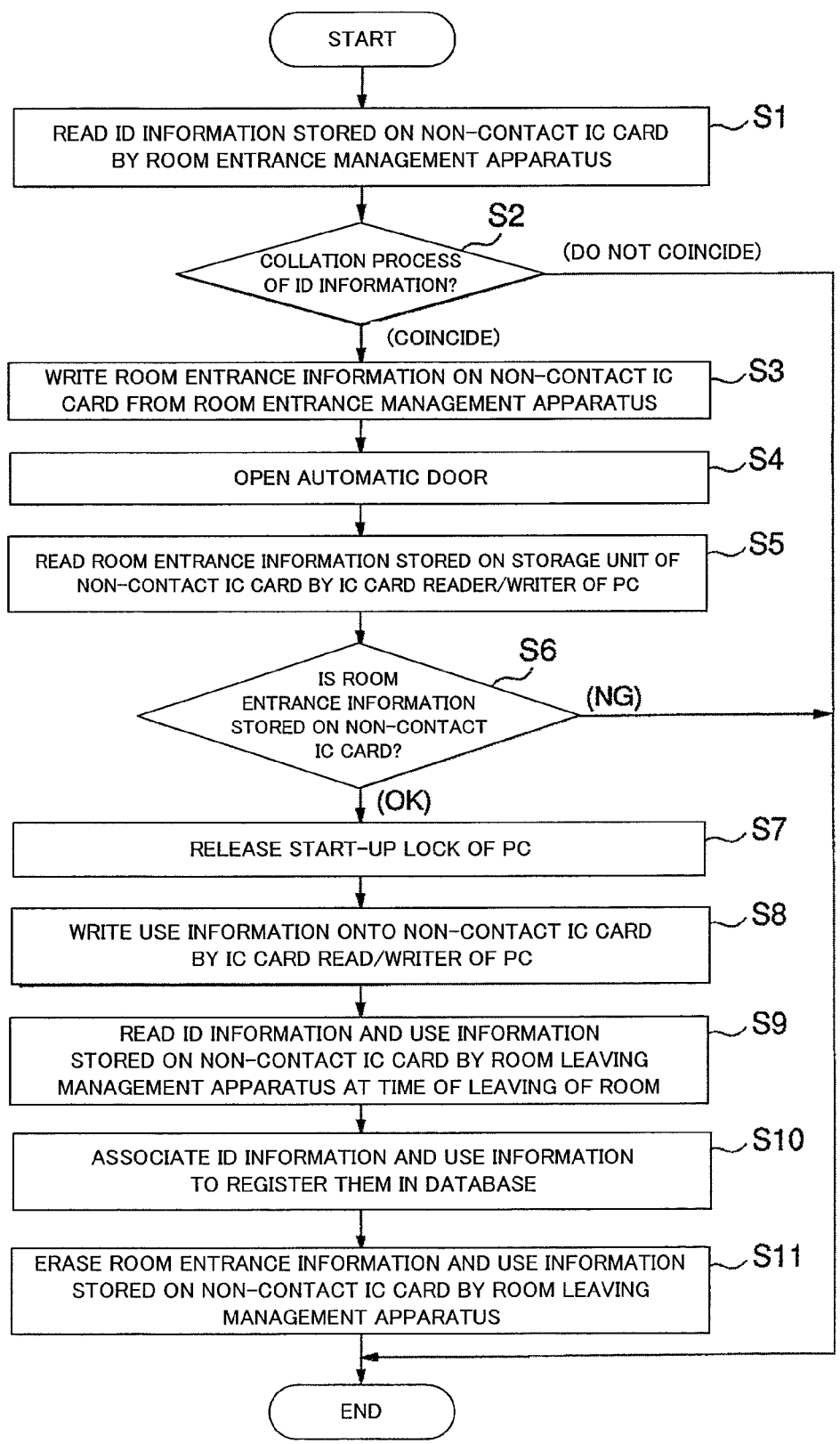
FIG. 7 is a flow chart showing a process by the use management system of the electronics according to the first embodiment.

The user who prints the data from the PC 1 provided in the room 4a with using the printer 34 executes the processes from steps S1 to S8 of the flow chart of the first embodiment shown in FIG. 7. After the process up to step S8 is completed, the user uses the PC 1, and the data for print output is transmitted from the PC 1 to the printer 34. Concretely, the user transmits the data for print output from the PC 1 to the printer 34 (step S12). When the user prints out from the printer 34, he or she puts the non-contact IC card 3 close to the IC card reader/writer 35 provided in the printer 34, and the IC card reader/writer 35 reads the storage unit 90 of the non-contact IC card 3 (step S13). Next, the printer 34 determines whether or not the room entrance information is written in the storage unit 90 of the non-contact IC card 3 (step S14). When it is determined that the room entrance information is written in the storage unit 90, the printer lock control unit 38 releases the start-up lock of the printer 34, which makes the printer 34 available (step S15).

Meanwhile, when it is determined that the room entrance information is not written in the storage unit 90, the start-up lock of the printer 34 is not released, and the printer 34 is kept unavailable. Thus, the user cannot use the printer 34, and the process ends.

As described above, in the second embodiment of the present invention, the plural electronics are provided in the room 4a, and the data is transmitted from the first electronics to the second electronics, e.g., from the PC to the printer. Even when the user uses the first electronics in order to print-output the data by using the second electronics, the second electronics determines whether or not the room entrance information is written in the non-contact IC card 3 of the user. When the room entrance information is not written, the user cannot use the second electronics.

(Modification)

In the above-mentioned embodiment, such an example that the flag is used is described as the room entrance information. However, instead of the flag, the information of the character and the number such as the room number may be used as the room entrance information. For example, when the room number is used as the room entrance information, the room number being the room entrance information is written onto the non-contact IC card 3 from the transmitting/receiving unit 11 by the control of the room entrance information writing unit 14 of the room entrance management apparatus 6. The user who enters the room from the entrance puts the non-contact IC card 3 close to the IC card reader/writer 9 provided in the PC 1, and makes the IC card reader/writer 9 read the room number stored on the non-contact IC card 3 to collate it with the collation room entrance information pre-stored in the PC 1. When they coincide with each other, the PC lock control unit 19 releases the start-up lock of the PC 1, which makes the PC 1 available.

Moreover, the IC card reader/writer 35 reads the room number stored in the non-contact IC card 3, and the printer 34 collates it with the collation room entrance information stored therein. When they coincide with each other, the printer 34 permits the output. Therefore, the room entrance information is not limited to the flag, and various kinds of information can be used.

Instead of the room entrance information, the other information associated with the room entrance information may be stored in the PC 1 and the printer 34, as the collation information.

Additionally, at the time of entering of the room, the room entrance information may be stored in a mobile phone on which the information storage medium is mounted. In this case, when using the electronics, the user who enters the room from the entrance transmits, to the electronics, the room entrance information stored in the mobile phone. Then, the transmitted room entrance information and the collation room entrance information pre-stored in the electronics are collated. When they coincide with each other, the electronics may be available.

[Third Embodiment]

A third embodiment is also such a case that the present invention is applied to the use management system of the electronics. Hereinafter, a description will be given of the use management system of the electronics according to the third embodiment.

Figure 11:
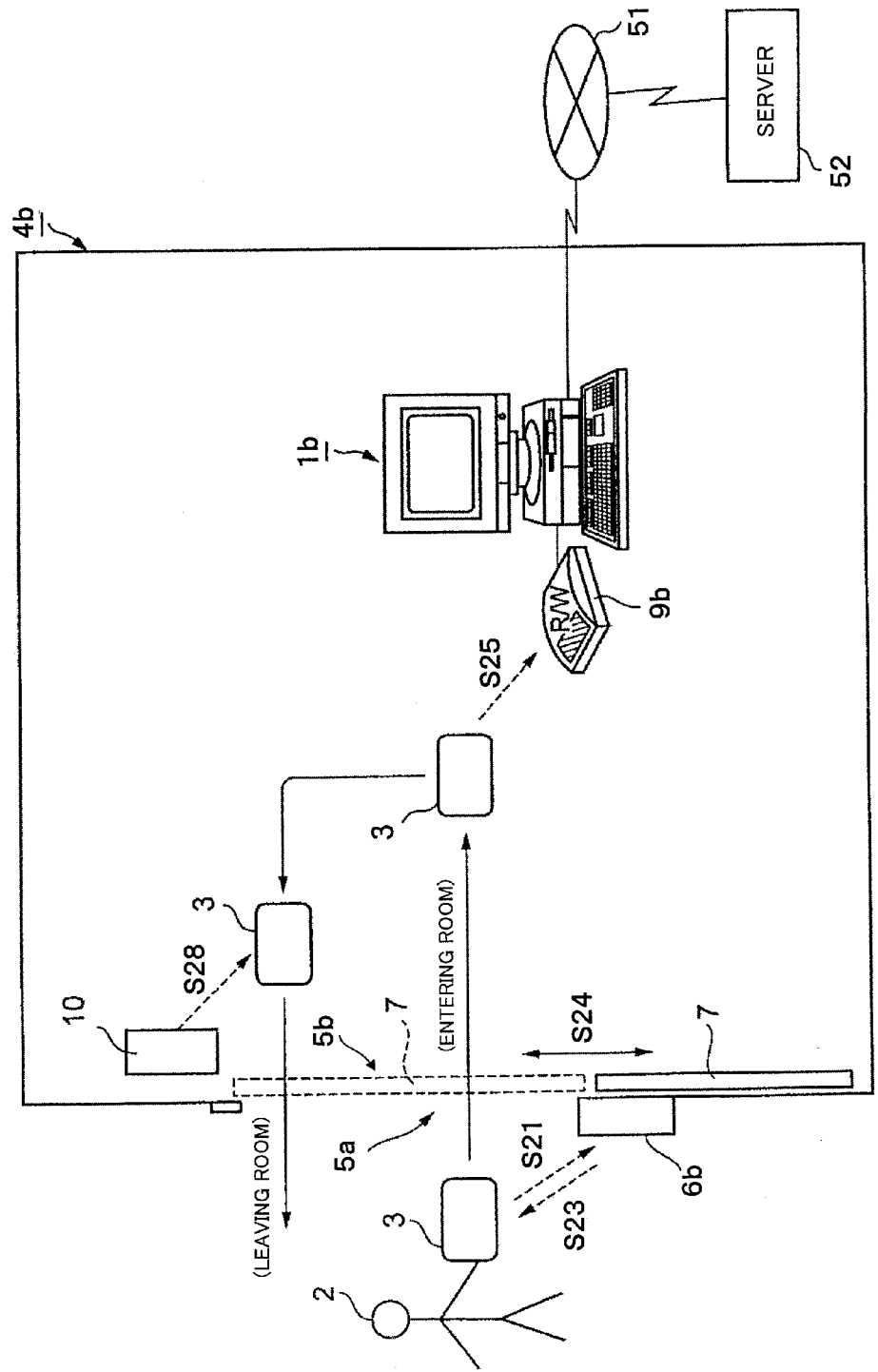
FIG. 11 is a schematic configuration diagram of the use management system of the electronics according to a third embodiment.

FIG. 11 shows a schematic configuration of an illegal use prevention system of the electronics according to the third embodiment. As shown in FIG. 11, a PC 1b is provided in the room 4b in which the entrance is managed.

From a company having the PC 1b, the non-contact IC card 3 being the storage medium is given to the user 2, who receives a use right of the PC 1b from the company. The non-contact IC card 3 is sometimes an ID card which the company having the PC 1b gives an employee as an employee card, which can prevent the third person other than the employee, who does not have the non-contact IC card 3 being the ID card, from illegally operating the PC 1.

A room entrance management apparatus 6b is provided in the vicinity of an entrance 5a of the room 4b, and the opening/closing state and the lock state of the automatic door 7 provided at the entrance 5a are controlled by the room entrance management apparatus 6b. The room entrance management apparatus 6b can transmit the information to the non-contact IC card 3 by the radio transmission, and it can read the information stored on the non-contact IC card 3 and write the information onto the non-contact IC card 3.

In correspondence with a result of a certification process based on the ID information stored on the non-contact IC card 3 of the user 2, the room entrance management apparatus 6b executes the control, and makes the automatic door 7 locked or makes it opened to make the user enter the room. Thereby, the room entrance management is executed so that the third person cannot illegally enter the room.

Additionally, a reader/writer 9*b* provided in the PC 1*b* can read the information stored on the non-contact IC card 3 and write the information onto the non-contact IC card 3 by the radio transmission without contact. Thereby, the information which the reader/writer 9*b* reads from the non-contact IC card 3 can be transmitted to the PC 1*b*, and the information from the PC 1 can be transmitted to the non-contact IC card 3 via the reader/writer 9*b*.

In addition, the PC 1*b* is connected to a server 52 via an Internet 51 being the network. In accessing the Internet 51 with using the PC 1*b*, a predetermined IP address is necessary. In accessing the Internet 51 with using the PC 1, it is necessary that the PC 1*b* reads the IP address stored on the non-contact IC card 3 via the reader/writer 9*b*.

Further, the room leaving management apparatus 10 is provided in the vicinity of the exit 5*b* of the room 4*b*, and the opening/closing state of the automatic door 7 is controlled by the room leaving management apparatus 10. In addition, the room leaving management apparatus 10 can transmit the information to the non-contact IC card 3 by the radio transmission, and it can read the information stored on the non-contact IC card 3 and write the information onto the non-contact IC card 3.

Since the structure and the function of the non-contact IC card 3 being the storage medium are same as those of the first and second embodiments, explanations thereof are omitted.

Figure 12:
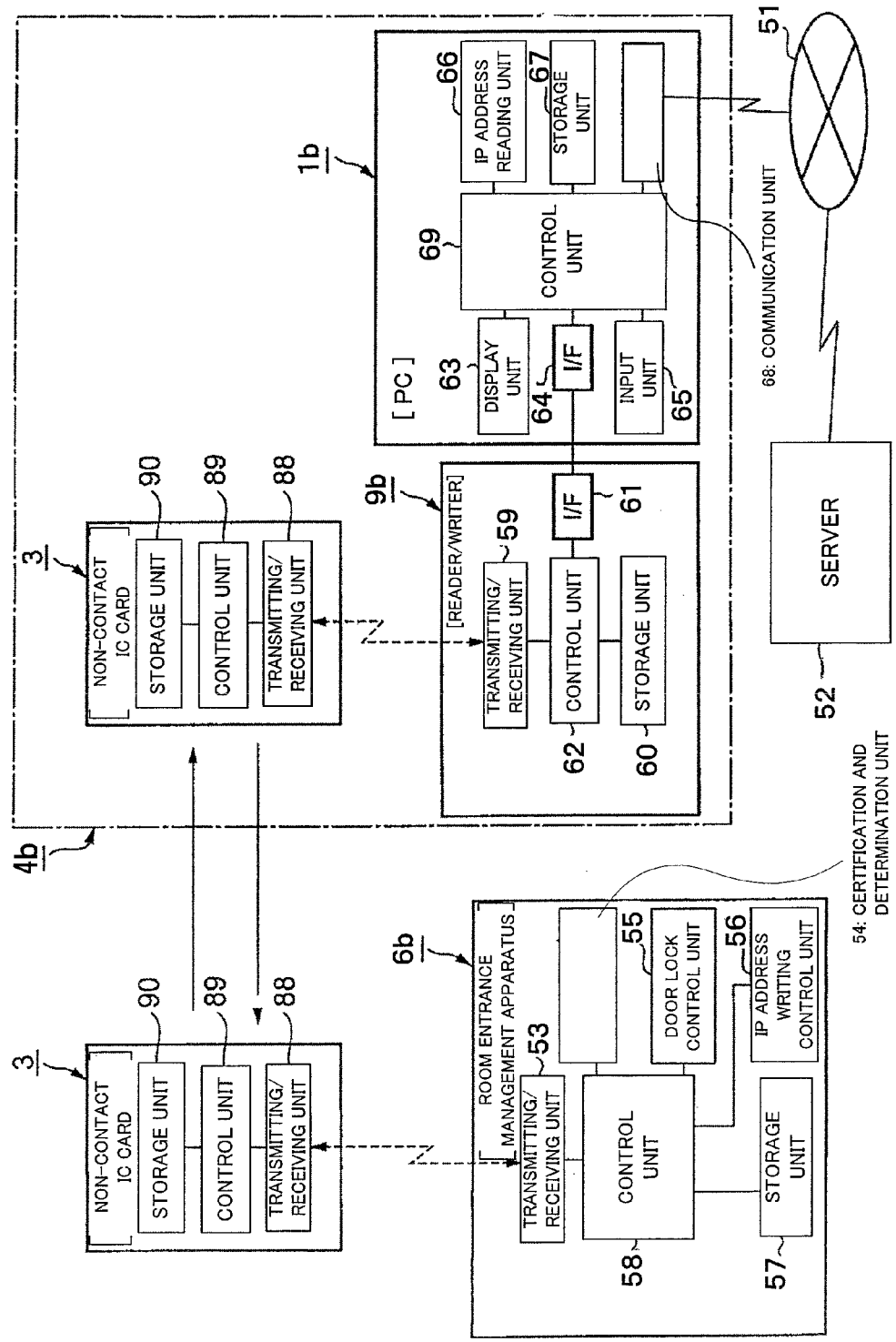
FIG. 12 is a functional block diagram of the use management system of the electronics according to the third embodiment.

Next, the configuration of the use management system of the electronics according to the third embodiment will be explained in detail, with reference to a functional block diagram shown in FIG. 12. FIG. 12 shows the system configuration including the non-contact IC card 3, the room entrance management apparatus 6*b*, the reader/writer 9*b* and the PC 1*b*.

The room entrance management apparatus 6*b* provided in the vicinity of the entrance 5*a* includes a transmitting/receiving unit 53, a certification and determination unit 54, a door lock control unit 55, an IP address writing control unit 56, a storage unit 57 and a control unit 58.

The transmitting/receiving unit 53 transmits and receives the information to and from the transmitting/receiving unit 88 of the non-contact IC card 3 by the radio transmission. The certification and determination unit 54 collates the ID information received from the non-contact IC card 3 and the collation ID information pre-stored in the storage unit 57 to execute the process of the identity certification. When the identity certification is accepted in the certification process by the certification and determination unit 54, the door lock is released by the door lock control unit 55, and the automatic door 7 is opened.

When the identity certification is accepted by the certification and determination unit 54 and the person is permitted to use the Internet, the IP address writing control unit 56 controls the transmitting/receiving unit 53 of the room entrance management apparatus 6*b* on the basis of the ID information, and writes the IP address onto the non-contact IC card 3. By transmitting the IP address information to the non-contact IC card 3 from the room entrance management apparatus 6*b*, the IP address information is written to the storage unit 90 of the non-contact IC card 3.

The reader/writer 9*b* includes a transmitting/receiving unit 59, a storage unit 60, an interface (I/F) 61 and a control unit 62. The transmitting/receiving unit 59 transmits and receives the information to and from the transmitting/receiving unit 88 of the non-contact IC card 3 by the radio transmission. The reader/writer 9*b* is connected to the interface (I/F) of the PC 1*b* via the interface (I/F) 61 and transmits the IP address information read from the non-contact IC card 3 to the PC 1*b*.

The PC 1*b* includes a display unit 63, an interface (I/F) 64, an input unit 65, an IP address reading unit 66, a storage unit 67, a communication unit 68 and a control unit 69. The IP address reading unit 66 reads the IP address stored on the non-contact IC card 3 via the reader/writer 9*b* and temporally stores it in the storage unit 67. The IP address temporally stored in the storage unit 67 is erased from the storage unit 67 at the time of turning off the power of the PC 1*b* so that other user cannot use it again.

Figure 6:
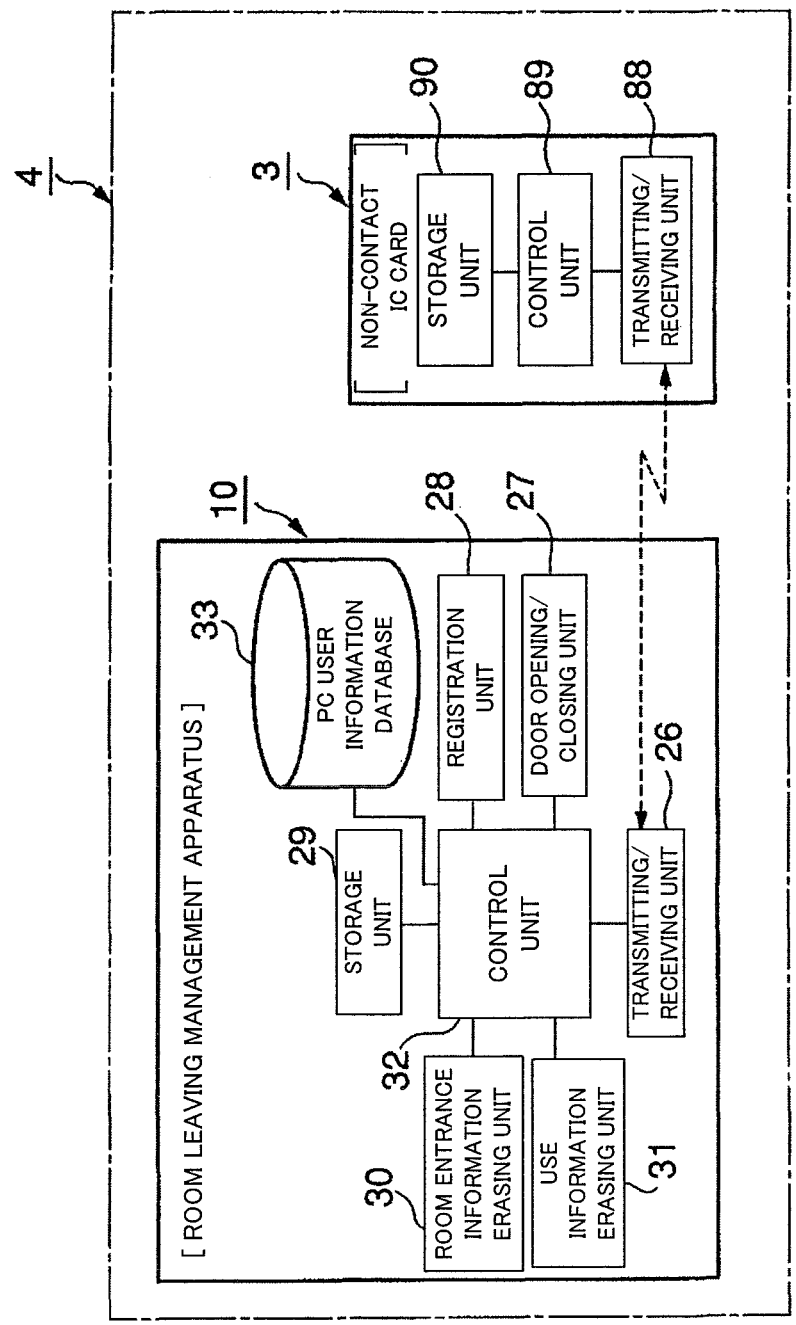
FIG. 6 is a functional block diagram of the use management system of the electronics according to the first embodiment.

Since the configuration of the room leaving management apparatus 10 is basically same as those of the first and second embodiments shown in FIG. 6, an explanation thereof is omitted. However, in the third embodiment, the room leaving management apparatus 10 includes the IP address erasing unit which erases the IP address stored on the non-contact IC card 3.

In the third embodiment having the above-mentioned configuration, the room 4*b* corresponds to the facilities. The room entrance management apparatus 6*b* serves as the entrance management apparatus, and the room leaving management apparatus 10 serves as the room leaving management apparatus. In addition, the ID information serves as the use permission information, and the PC 1*b* serves as the management object and the use management apparatus.

Figure 13:
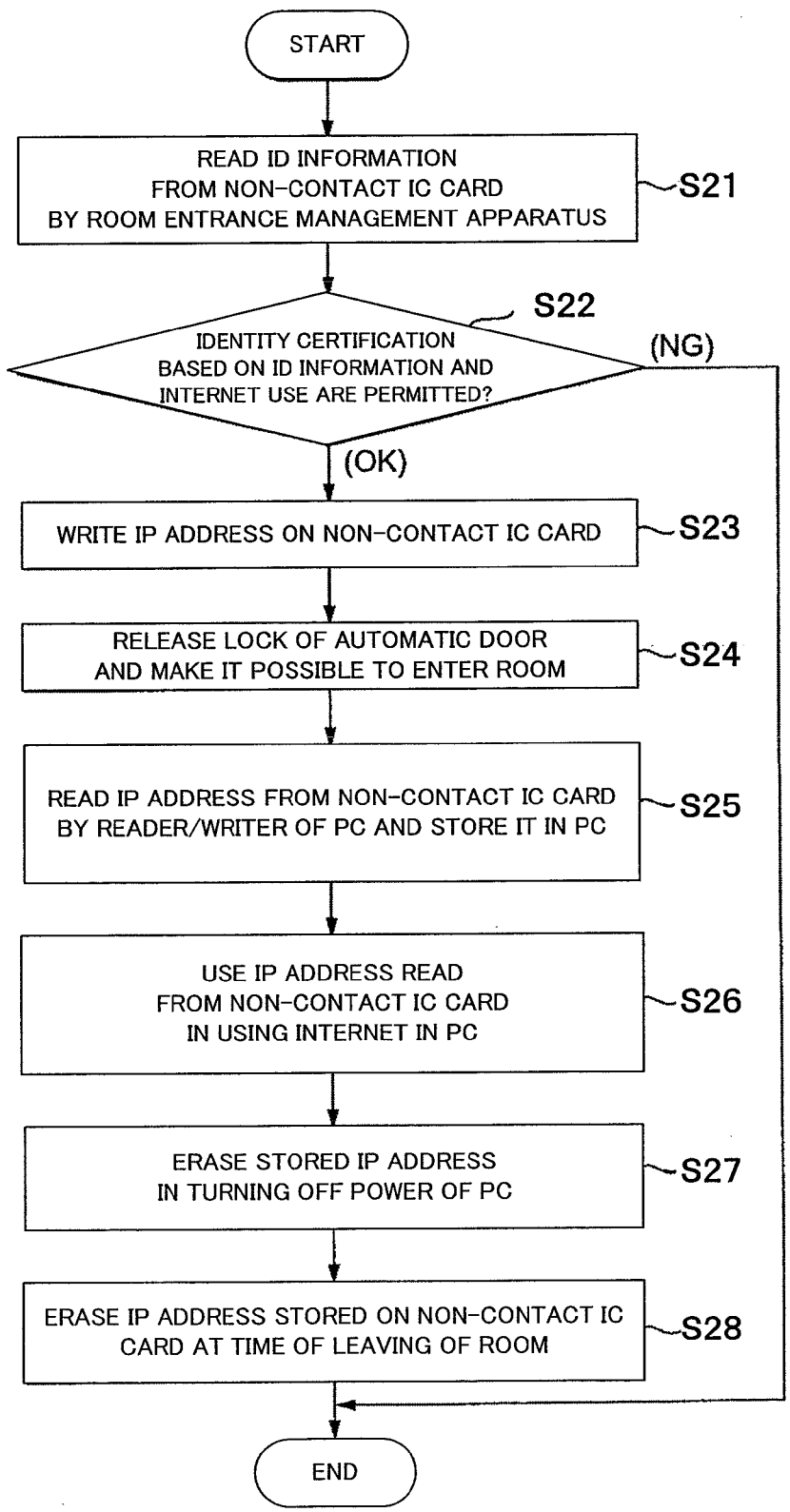
FIG. 13 is a flow chart showing the process by the use management system of the electronics according to the third embodiment.

Next, a process according to the third embodiment will be explained with reference to a flow chart shown in FIG. 13. First, the user 2 who uses the PC 1*b* provided in the room 4*b* puts the non-contact IC card 3 close to the room entrance management apparatus 6*b* at the time of entering the room 4*b* from the entrance thereof. At this time, the room entrance management apparatus 6*b* reads the ID information stored in the storage unit 90 of the non-contact IC card 3 (step S21). Then, by the certification and determination unit 54 of the room entrance management apparatus 6*b*, the identity certification and determination in correspondence with the read ID information is executed (step S22).

When the identity certification is accepted in the identity certification and determination and the use of the Internet is permitted to the user, the IP address is transmitted to the non-contact IC card 3 from the transmitting/receiving unit 53 by the control of the IP address writing control unit 56 of the room entrance management apparatus 6*b*, and the IP address is written into the storage unit 90 of the non-contact IC card 3 (step S23). Substantially simultaneously, the door lock control unit 55 releases the lock of the automatic door 7, and the automatic door 7 is opened. Thereby, the user can enter the room (step S24).

Meanwhile, when the identity certification is not accepted in the identity certification and determination in step S22, the IP address is not transmitted to the non-contact IC card 3 from the room entrance management apparatus 6*b*. In addition, the automatic door 7 is kept closed, and the user cannot enter the room. In such a situation, the process ends.

Next, the user who enters the room from the entrance 5*a* puts the non-contact IC card 3 close to the reader/writer 9*b* provided in the PC 1*b*. At this time, the IP address stored on the non-contact IC card 3 is read and stored in the storage unit 67 of the PC 1*b* (step S25). Thereby, the user of the PC 1*b* can access the server 52 by using the IP address, and he or she can use the Internet (step S26).

When the user of the PC 1*b* turns off the power of the PC 1*b*, the IP address stored in the storage unit 67 is erased (step S27). Moreover, when the user of the PC 1*b* leaves the room 4b, the IP address stored in the storage unit 90 of the non-contact IC card 3 is erased by the signal outputted from the room leaving management apparatus 10 provided at the exit 5b of the room 4b (step S28).

As described above, in the third embodiment, when the user enters the room 4b, the IP address is written onto the storage medium for only the user whose certification is accepted, and the user can access the Internet with using the PC 1b by using the IP address.

[Fourth Embodiment]

Figure 14:
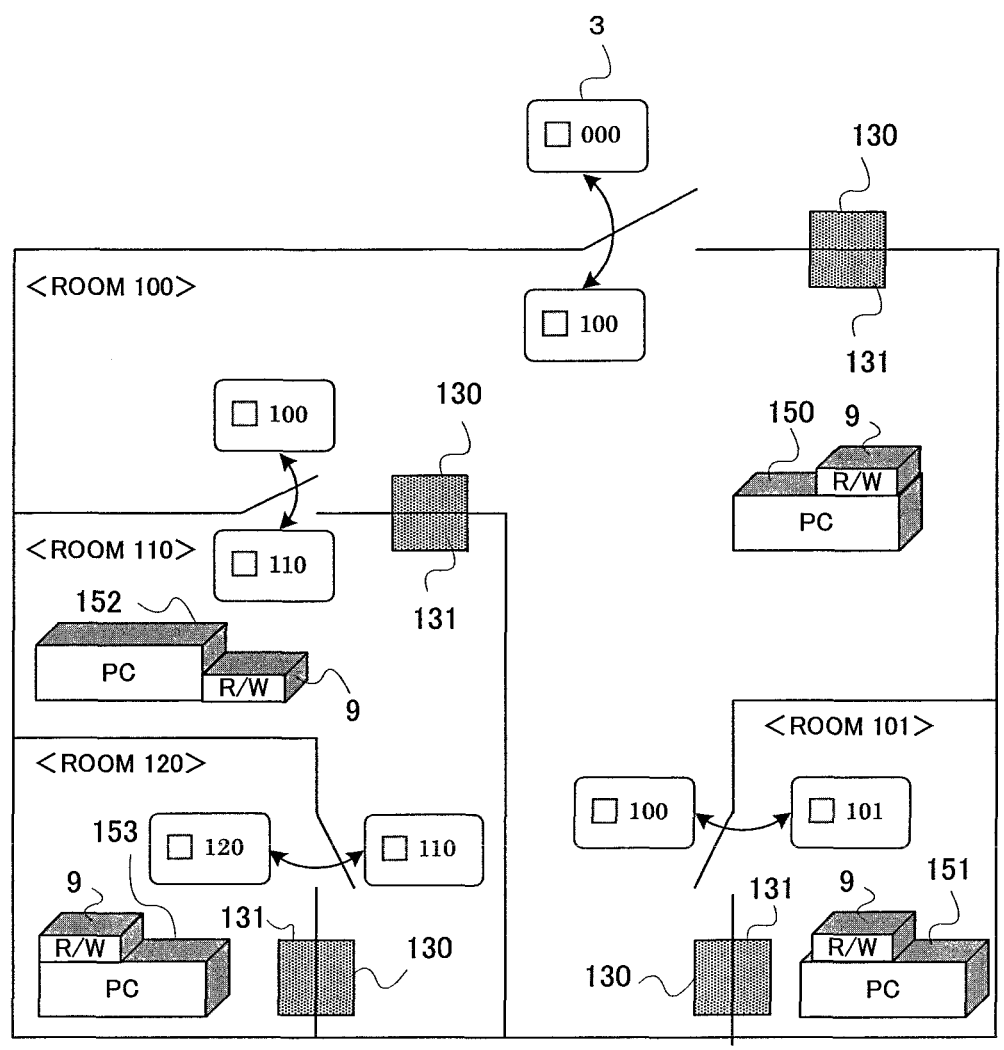
FIG. 14 is a schematic configuration diagram of the use management system of the electronics according to a fourth embodiment.

A fourth embodiment is such a case that the present invention is applied to the use management system of the electronics. FIG. 14 shows a schematic configuration of the use management system according to the fourth embodiment. In an example shown in FIG. 14, a room 100 includes plural rooms 101 and 110, and the room 110 includes a room 120.

As examples of the electronics, personal computers (PCs) 150 to 153 are provided in the respective rooms 100, 101, 110 and 120. Each of the PCs 150 to 153 basically has the same configuration as that of the PC 1 according to the first embodiment shown in FIG. 5. Further, each of the PCs 150 to 153 includes the IC card reader/writer 9, similarly to the first embodiment.

Moreover, at the entrance/exit of each of the rooms 100, 101, 110 and 120, a room entrance management apparatus 130 and a room leaving management apparatus 131 are provided, respectively. The room entrance management apparatus 130 basically has the same configuration as that of the room entrance management apparatus 6 of the first embodiment, and controls the door opening/closing of the room. In addition, the room leaving management apparatus 131 also basically has the same configuration as that of the room leaving management apparatus 10 of the first embodiment, and controls the door opening/closing of each of the rooms. However, the room entrance management apparatus 130 and the room leaving management apparatus 131 have a function to rewrite the entrance information stored on the non-contact IC card 3 when the user enters and exits the room.

In this embodiment, the room number is used as the room entrance information, as shown in FIG. 14. The room entrance information out of the room 100 is prescribed as "000". As shown in FIG. 14, when the user enters the room 100 from the outside, the room entrance management apparatus 130 rewrites the room entrance information "000" stored on the non-contact IC card 3 to "100" corresponding to the room 100. When the user enters the room 110, the room entrance management apparatus 130 rewrites the room entrance information "100" stored on the non-contact IC card 3 to "110". Similarly, when the user enters the room 101 from the room 100, the room entrance management apparatus 130 rewrites the room entrance information "100" to "101". When the user enters the room 120 from the room 110, the room entrance management apparatus 130 rewrites the room entrance information "110" to "120".

Only when the room entrance information stored on the non-contact IC card 3 of the user coincides with the number of the room in which the PC is provided, the start-up lock of the PC provided in each of the rooms is released, and the PC becomes available. Namely, the PC 150 provided in the room 100 stores the collation room entrance information "100" in the storage unit. Thus, only the user having the non-contact IC card 3 including the room entrance information "100" can use the PC 150. Specifically, when the user puts the non-contact IC card 3 close to the IC card reader/writer 9, the IC card reader/writer 9 reads the room entrance information from the storage unit 90 of the non-contact IC card 3 and transmits it to the control unit of the PC 150. The control unit of the PC 150 collates the room entrance information with the collation room entrance information stored in the storage unit of the PC. Only when they coincide with each other, the PC lock control unit releases the start-up lock.

Similarly, the PC 151 provided in the room 101 is available by only the user having the non-contact IC card 3 on which the room entrance information "101" is stored, and the PC 152 provided in the room 110 is available by only the user having the non-contact IC card 3 on which the room entrance information "110" is stored. The PC 153 provided in the room 120 is available by only the user having the non-contact IC card 3 on which the room entrance information "120" is stored.

In the fourth embodiment having the above-mentioned configuration, the floor including each of the rooms 100 to 120 corresponds to the facilities, and each of the rooms 100 to 120 corresponds to a separate space included in the facilities. The room entrance management apparatus 130 serves as the entrance management apparatus, and the room leaving management apparatus 131 serves as the leaving management apparatus. Additionally, the room entrance information serves as the use permission information, and the PCs 150 to 153 serve as the management object and the use management apparatus.

Figure 15A:
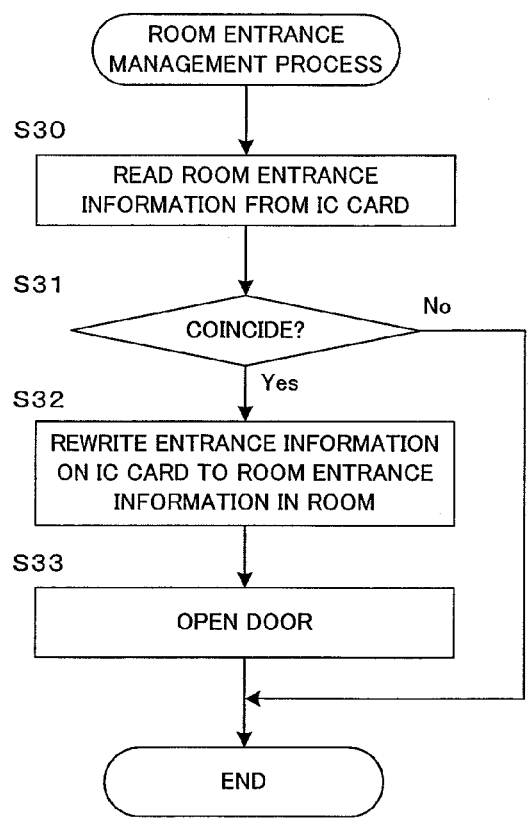
FIG. 15 is a flow chart showing the process by the use management system of the electronics according to the fourth embodiment.

FIG. 15A shows a flow chart of the room entrance management process by the room entrance management apparatus 130. When the user entering the room puts the non-contact IC card 3 close to the room entrance management apparatus 130, the room entrance management apparatus 130 reads the room entrance information from the non-contact IC card 3 (step S30). Then, the room entrance management apparatus 130 collates the read room entrance information with the collation room entrance information pre-stored in the storage unit (step S31). When they coincide with each other, the room entrance management apparatus 130 rewrites the room entrance information of the non-contact IC card 3 to the room entrance information (the room number in this embodiment) of the room which the user enters (step S32), and opens the room door (step S33). Thereby, the user can enter the room. In addition, since the room entrance information stored on the non-contact IC card 3 is rewritten to the room number, the PC provided in the room is usable. Meanwhile, as a result of the collation, when the room entrance information do not coincide with each other (step S31; No), the process ends. Therefore, the user cannot enter the room.

Figure 15B:
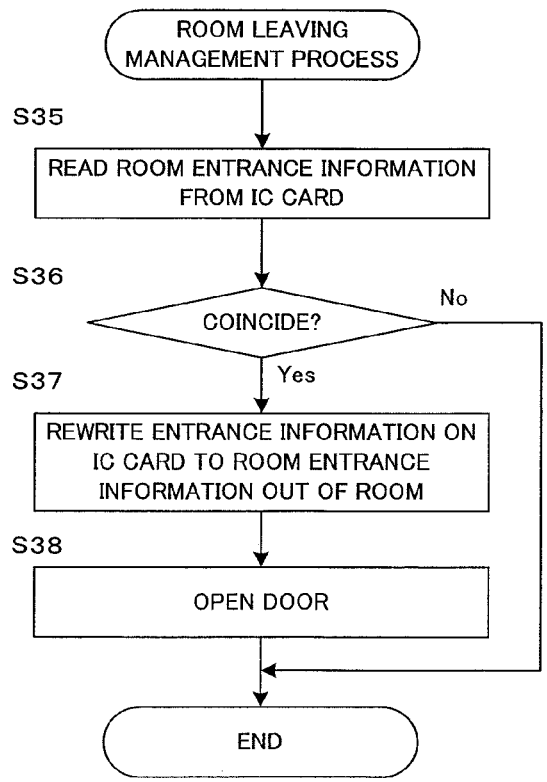

FIG. 15B shows a flow chart of the room leaving management process by the room leaving management apparatus 131. When the user leaving the room puts the non-contact IC card 3 close to the room leaving management apparatus 131, the room entrance management apparatus 131 reads the room entrance information from the non-contact IC card 3 (step S35). Then, the room entrance management apparatus 131 collates the read room entrance information with the collation room entrance information pre-stored in the storage unit (step S36). When they coincide with each other, the room entrance management apparatus 131 rewrites the room entrance information of the non-contact IC card 3 to the room entrance information (the room number in this embodiment, but "000" in a case of the outside of the room 100) of the room out of the room which the user leaves (step S37), and it opens the room door (step S38). Thereby, the user can leave the room. Meanwhile, as a result of the collation, when the room entrance information do not coincide with each other (step S36; No), the process ends. Thus, the user cannot leave the room.

Next, a description will be given of a change of the room entrance information in such a case that the user enters the rooms 100, 110, 120 and 101 in this order and leaves the room 100, with reference to FIG. 14. When the user previously entered and exited the rooms in the proper process, the room entrance information of the non-contact IC card 3 is "000". When the user enters the room 100, the room entrance information of the non-contact IC card 3 is rewritten from "000" to "100". Then, the user can use the PC 150 in the room 100.

Next, when the user enters the room 110, the room entrance information of the non-contact IC card 3 is rewritten from "100" to "110". Thereby, the user can use the PC 152 in the room 110. Moreover, when the user enters the room 120, the room entrance information of the non-contact IC card 3 is rewritten from "110" to "120". Thereby, the user can use the PC 153 in the room 120.

Next, when the user leaves the room 120, the room entrance information of the non-contact IC card 3 is rewritten from "120" to "110". In addition, when the user leaves the room 110, the room entrance information of the non-contact IC card 3 is rewritten from "110" to "100". Next, when the user enters the room 101, the room entrance information of the non-contact IC card 3 is rewritten from "100" to "101". Thereby, the user can use the PC 151 in the room 101. Next, when the user leaves the room 101, the room entrance information of the non-contact IC card 3 is rewritten from "101" to "100". When the user leaves the room 100, the room entrance information of the non-contact IC card 3 is rewritten from "100" to "000". In this manner, when the user enters the room 100 next time, the non-contact IC card 3 is properly rewritten to "000".

As described above, in the fourth embodiment, even in such a case that the PCs are provided in the plural rooms, respectively, only when the room entrance information stored on the non-contact IC card 3 with the proper approach of the room by the user coincides with the collation room entrance information pre-stored in the PC of the room, the PC becomes available. Hence, even when plural rooms are complexly arranged, it becomes possible to securely prevent the illegal use.

In the above-mentioned example, such an example that the PC is arranged in each of the rooms is given. However, the application of the present invention is not limited to this. Namely, the present invention is applicable in such a case that the use of all the equipments having the configuration for releasing the lock control by the collation of the room entrance information is controlled. In addition, plural equipments may be provided in one room.

Further, in this embodiment, similarly to the first embodiment, when the equipment such as the PC is used, the use information showing the use may be written onto the IC card 3. In addition, when the user leaves the room, the use information stored on the IC card 3 may be erased or stored on the IC card 3. Moreover, when the user leaves the room, the use information may be stored in the database in the room leaving control apparatus as the use history.

[Fifth Embodiment]

Figure 16:
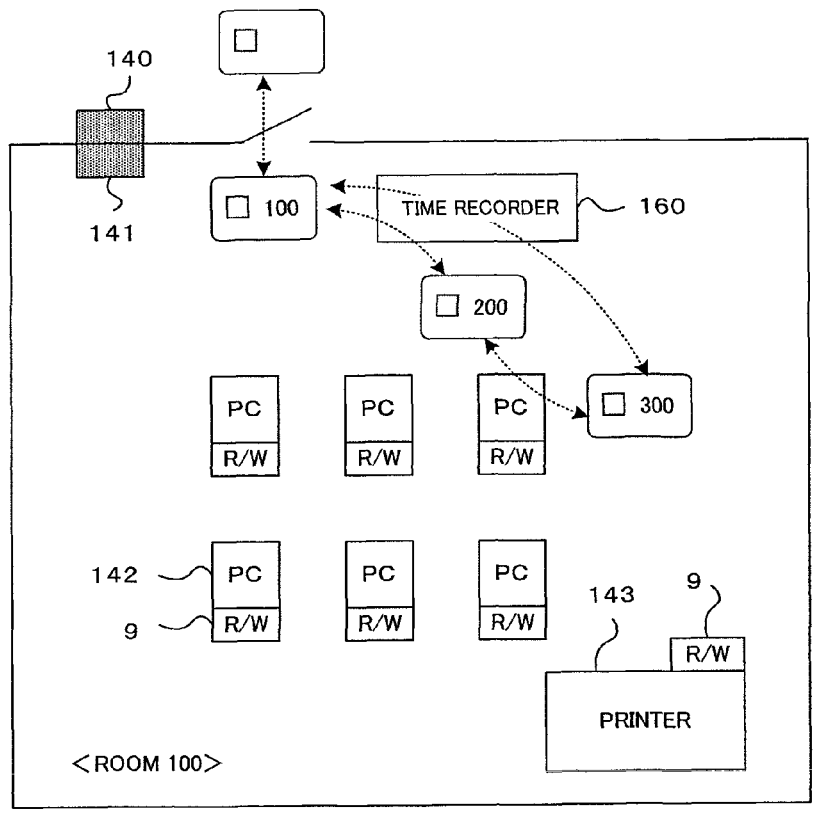
FIG. 16 is a schematic configuration diagram of the use management system of the electronics according to a fifth embodiment.

A fifth embodiment is also such a case that the present invention is applied to the use management system of the electronics. FIG. 16 shows a schematic configuration example of the use management system of the electronics according to the fifth embodiment. In an example shown in FIG. 16, plural PCs 142 and a printer 143 are provided in the room 100 as the electronics. The PCs 142 basically have the same structure as the PC 1 according to the first embodiment shown in FIG. 5. The printer 143 basically has the same configuration as the printer 34 of the second embodiment shown in FIG. 9. The IC card reader/writer 9 having the configuration shown in FIG. 5 is provided in the PCs 142 and the printer 143, respectively.

A room entrance management apparatus 140 having the same configuration as that of the room entrance management apparatus 130 of the fourth embodiment is provided out of the room 100, and a room leaving management apparatus 141 having the same configuration as that of the room leaving management apparatus 131 of the fourth embodiment is provided in the room 100.

Figure 17:
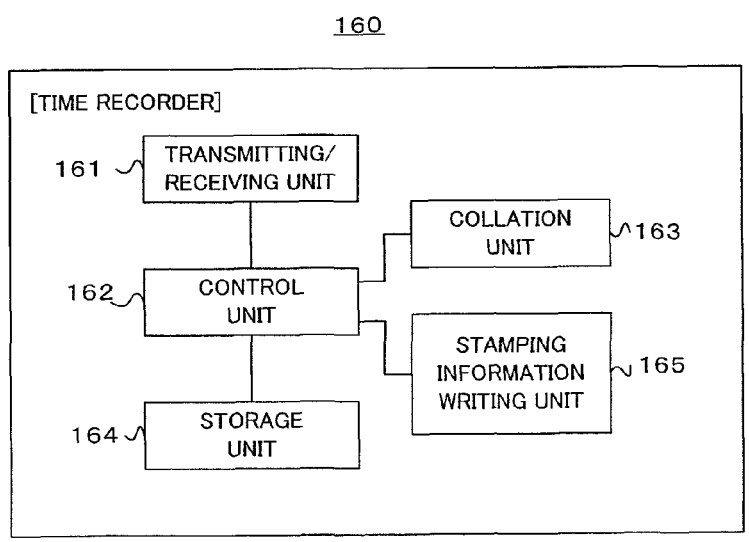
FIG. 17 is a functional block diagram of a time recorder shown in FIG. 16.

Additionally, in this embodiment, a time recorder 160 is provided in the room 100. The time recorder 160 has a function to record stamping information including a room entrance time and a room leaving time on the IC card 3. FIG. 17 shows the configuration of the time recorder 160.

As shown in FIG. 17, the time recorder 160 includes a transmitting/receiving unit 161, a control unit 162, a collation unit 163, a storage unit 164 and a stamping information writing unit 165. The transmitting/receiving unit 161 transmits and receives the information to and from the transmitting/receiving unit 88 of the IC card 3 by the radio transmission.

When the user enters the room, the collation unit 163 collates the room entrance information received from the IC card 3 with the collation room entrance information pre-stored in the storage unit 164. When the room entrance information coincide with each other in the collation by the collation unit 163, the stamping information writing unit 165 writes the stamping information at the time of the room entrance onto the IC card 3. The stamping information at the time of the room entrance includes information for specifying the time recorder (e.g., an identification number of the time recorder, hereinafter referred to as "time recorder specifying information"), in addition to the room entrance date and time of the user.

Additionally, when the user leaves the room, the collation unit 163 reads the stamping information at the time of the room entrance, which is stored on the IC card 3, and checks whether or not the proper time recorder specifying information is included. In addition, when the user leaves the room, the stamping information writing unit writes the stamping information at the time of the room leaving onto the IC card 3. The stamping information at the time of the leaving time includes the leaving date and time of the user and the time recorder specifying information.

The PC 142 pre-stores collation time recorder specifying information in the inner storage unit. When the user puts the IC card 3 close to the IC card reader/writer 9, the PC 142 reads the time recorder specifying information stored on the IC card 3 and collates it with the collation time recorder specifying information stored in the storage unit. Thus, only the user having the IC card 3 including the stamping information properly stored by the time recorder 160 can use the PC 142. Additionally, when the time recorder specifying information coincide with each other, the PC 142 releases the start-up lock, which makes the PC 142 available. Then, the PC 142 writes the use information onto the IC card 3.

The printer 143 pre-stores the collation use information in the inner storage unit. When the user puts the IC card 3 close to the IC card reader/writer 9, the printer 143 reads the use information stored on the IC card 3 and collates it with the collation use information stored in the storage unit. Therefore, only the user who actually has used the PC 142 can use the printer 143. The PC 142 and the printer 143 are connected to each other via the LAN, and the data to be printed is transmitted to the printer 143 from the PC 142 via the LAN.

In the fifth embodiment having the above-mentioned configuration, the room 100 corresponds to the facilities, and the room entrance management apparatus 140 serves as the entrance management apparatus. The room leaving management apparatus 141 serves as the leaving management apparatus. In addition, the stamping information by the time recorder 160 serves as the use permission information, and the PC 142 and the printer 143 serve as the management object and the use management apparatus.

Figure 18:
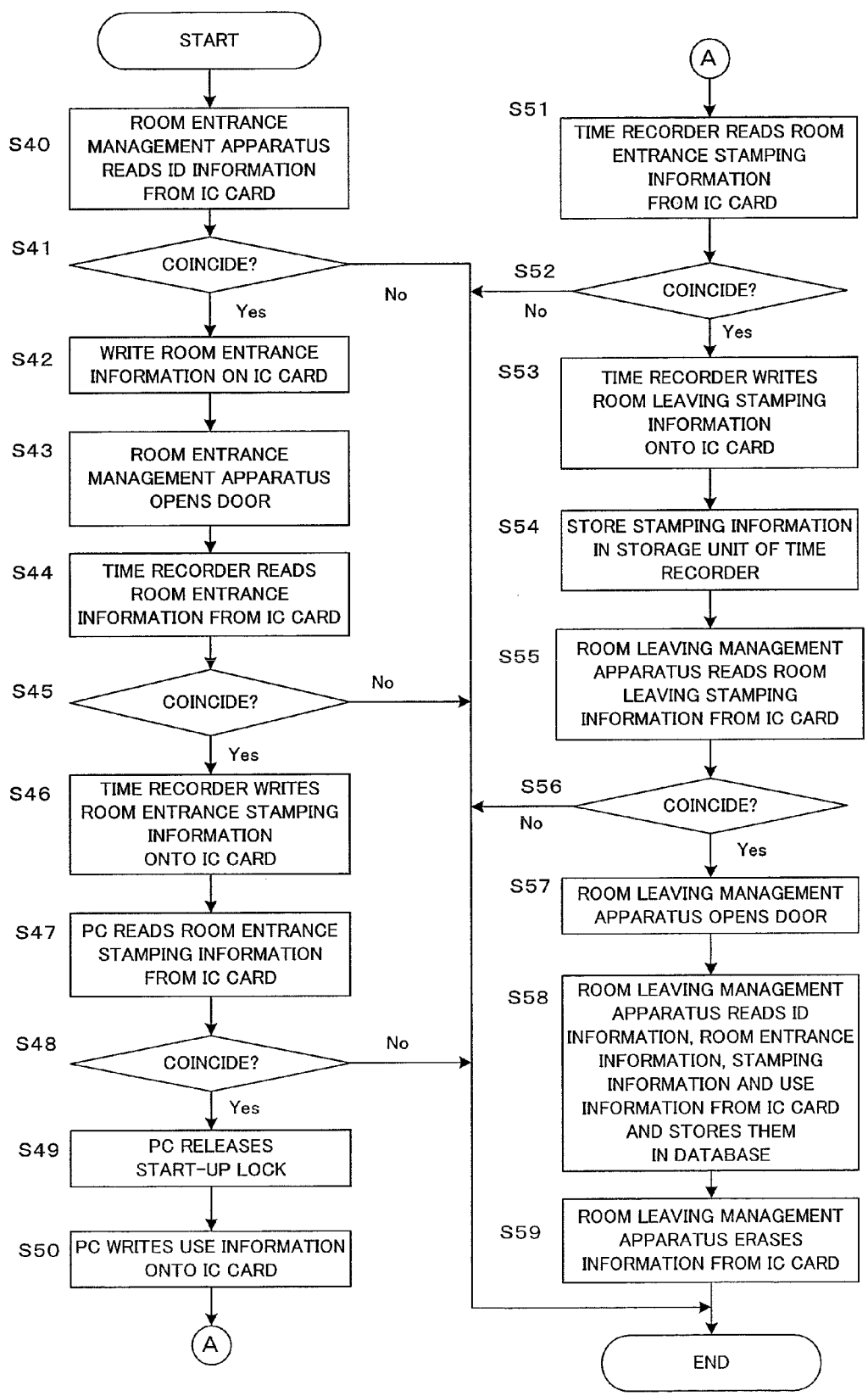
FIG. 18 is a flow chart of the process by the use management system of the electronics according to the fifth embodiment.

Next, a description will be given of a process in such a case that the user uses the system of the fifth embodiment. FIG. 18 is a flow chart of the process according to the fifth embodiment.

First, when the user puts the IC card 3 close to the room entrance management apparatus 140, the room entrance management apparatus 140 reads the ID information from the IC card 3 (step S40) and collates it with the collation ID information pre-stored in the storage unit (step S41). When the ID information does not coincide, the process ends. In this case, the door does not open, and the user cannot enter the room 100. Meanwhile, when the ID information coincide with each other, the room entrance management apparatus 140 writes the room entrance information in the storage unit 90 of the IC card 3 (step S42) and opens the door (step S43). In this case, the room entrance information is prescribed as "100" being the room number of the room 100, for example. Thereby, the user can enter the room 100.

When entering the room, the user puts the IC card 3 close to the time recorder 160. The time recorder 160 reads the room entrance information from the IC card 3 (step S44) and collates it with the room entrance information pre-stored in the storage unit 164 (step S45). In the storage unit 164 of the time recorder 160, "100" is stored as the collation room entrance information corresponding to the room 100. When the room entrance information do not coincide with each other, the process ends. Meanwhile, when they coincide, the time recorder 160 writes the stamping information at the time of the room entrance onto the IC card 3 (step S46). The stamping information at the time of the room entrance includes "200" as the time recorder specifying information corresponding to the time recorder, for example.

Next, the user puts the IC card 3 close to the IC card reader/writer 9 provided in the PC 142 in order to use the PC 142. The IC card reader/writer 9 reads the stamping information at the time of the room entrance from the IC card 3 to read the time recorder specifying information "200" included therein (step S47). The collation time recorder specifying information "200" is pre-stored in the storage unit 21 in each of the PCs 142 in the room 100. The PC 142 collates the time recorder specifying information with it (step S48). When they do not coincide with each other, the process ends. In this case, the user cannot use the PC 142. Meanwhile, when the time recorder specifying information coincide with each other, the start-up lock of the PC 142 is released, and the PC 142 becomes available (step S49). Moreover, the PC 142 writes the use information onto the IC card 3 (step S50).

When the user completes the work with using the PC 142, he or she puts the IC card 3 close to the time recorder 160. The time recorder 160 reads the stamping information at the time of the room entrance from the IC card 3 (step S51), and collates the time recorder specifying information included in the stamping information with its specifying information (step S52). When they coincide, the time recorder 160 writes the stamping information at the time of the room leaving onto the IC card 3 (step S53) and stores the stamping information at the time of the room entrance and the room leaving in the storage unit 164 of the time recorder 160 (step S54).

Next, when the user puts the IC card 3 close to the room leaving management apparatus 141, the room leaving management apparatus 141 reads the stamping information at the time of the room leaving from the IC card 3 (step S55) and collates the time recorder specifying information included therein with the collation time recorder specifying information pre-stored in the room leaving management apparatus 141 (step S56). When they do not coincide with each other, the process ends. Thus, the user cannot exit the room. Meanwhile, when they coincide, the room leaving management apparatus 141 opens the door (step S57). Thereby, the user can exit the room 100. Additionally, as need arises, the room leaving management apparatus 141 reads, from the IC card 3, the ID information, the room entrance information, the stamping information at the time of the room entrance and the room leaving and the use information of the equipment such as the PC, and stores them in the PC use information database 33 as the history information (step S58). Furthermore, as need arises, the room leaving management apparatus 141 erases the room entrance information, the stamping information and the use information from the IC card 3 (step S59).

In the above example, since the respective pieces of information are erased from the IC card 3 in step S59, the memory of the IC card can be saved. Moreover, since the information of the time recorder is not taken out of the room, the security advantageously becomes high. However, when the history such as the use information is needed to be left on the IC card 3, step S59 may be omitted.

As described above, in the fifth embodiment, since the use limit of the equipment is normally performed by using the stamping information of the time recorder used for the time management of the room entrance and leaving, only the user properly performing the stamping can use the equipment, and the illegal use of the equipment can be prevented.

In the above embodiment, instead of the ID information, various kinds of information associated with the ID information, other than the ID information, maybe stored in the room entrance management apparatus as the collation information. In addition, though the room number is used as the room entrance information in the above embodiment, various kinds of information other than the room number can be used.

(Modification)

In the above embodiment, such an example that the time recorder is in the room is explained, but the time recorder may be arranged out of the room. In this case, first, the user uses the time recorder and stores the stamping information on the IC card. The room entrance management apparatus pre-stores the collation time recorder specifying information. When the time recorder specifying information read from the IC card coincides with the collation time recorder specifying information, the room entrance management apparatus opens the room door. In addition, at the time of the room leaving, the room leaving management apparatus reads the time recorder specifying information from the IC card. Only when it coincides with the pre-stored collation time recorder specifying information, the room leaving management apparatus may open the door.

When the time recorder is arranged out of the room, one time recorder can be provided in correspondence with the plural rooms, and it also becomes possible to execute the working management of the IC card user who works out of the room.

[Sixth Embodiment]

Figure 19:
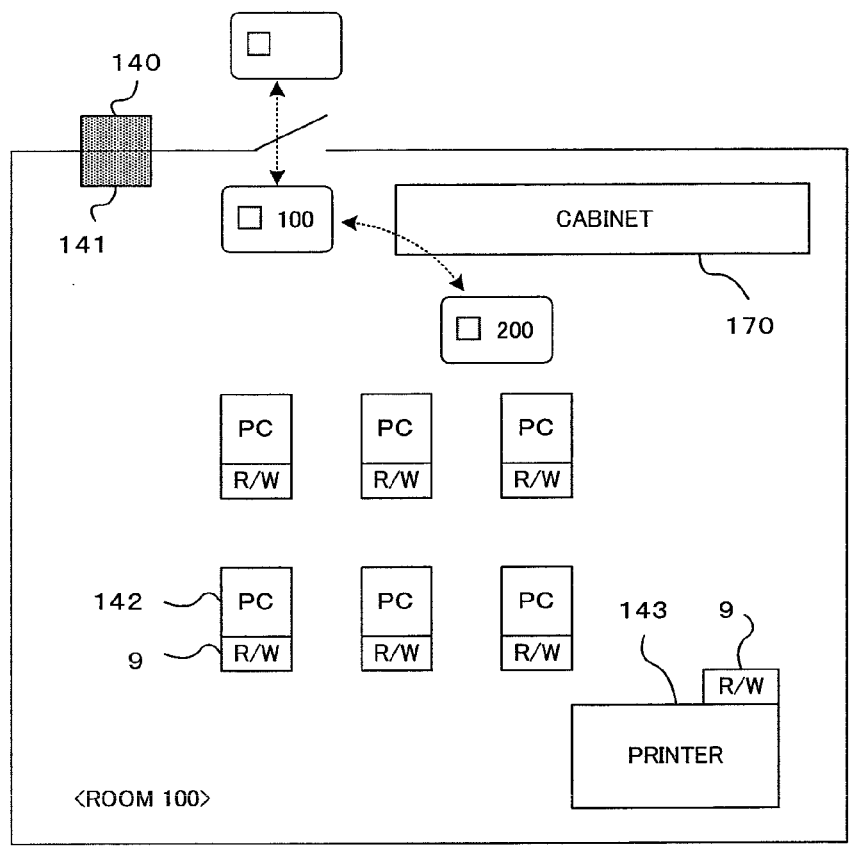
FIG. 19 is a schematic configuration diagram of the use management system of the electronics according to a sixth embodiment.

The sixth embodiment is similar to the fifth embodiment, and the schematic configuration is shown in FIG. 19.

As shown in FIG. 19, the plural PCs 142 and the printer 143 are provided in the room 100, as the example of the electronics. The PC 142 basically has the same configuration as that of the PC 1 of the first embodiment shown in FIG. 5. The printer 143 basically has the same configuration as that of the printer 34 of the second embodiment shown in FIG. 9. The IC card reader/writer 9 having the configuration shown in FIG. 5 is provided in the PC 142 and the printer 143, respectively.

The room entrance management apparatus 140 having the same configuration as that of the room entrance management apparatus 130 of the fourth embodiment is provided out of the room 100, and the room leaving management apparatus 141 having the same configuration as that of the room leaving management apparatus 131 of the fourth embodiment is provided in the room 100.

Additionally, as shown in FIG. 19, instead of the time recorder according to the fifth embodiment, a cabinet 170 is arranged in the room in the sixth embodiment. An important document, a storage medium and a laptop PC are put in the cabinet 170, and the user can use them and work only in the room. Namely, unless the user enters the room and operates the cabinet 170, he or she cannot use the equipment such as the PC 142 and the printer 143. At the time of leaving the room, unless the user properly restores the used items to the cabinet, he or she cannot leave the room.

Figure 20:
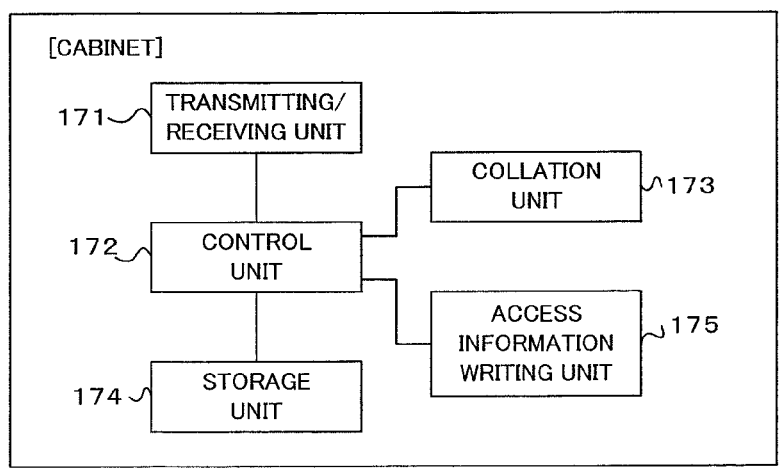
FIG. 20 is a functional block diagram of a cabinet shown in FIG. 19.

The configuration of the cabinet 170 is shown in FIG. 20. The cabinet 170 basically has the same configuration as that of the time recorder 160 of the fifth embodiment shown in FIG. 17, and includes a transmitting/receiving unit 171, a control unit 172, a collation unit 173 and a storage unit 174. However, the cabinet 170 includes an access information writing unit 175 for writing the access information to the cabinet 170 onto the IC card 3, instead of the stamping information writing unit 165. The access information includes the access date and time in which the user accesses the cabinet 170 and the cabinet specifying information, for example. When the user accesses the cabinet 170, the cabinet 170 stores, on the IC card 3, the access information at the time of entering the room, including the cabinet specifying information. The PC 142 pre-stores the same information as the cabinet specifying information, as the collation information. Only when the cabinet specifying information read from the IC card of the user coincides with the collation information, the start-up lock of the PC 142 is released. In addition, at the time of leaving the room, the cabinet 170 stores the access information at the time of leaving the room onto the IC card. Only when the access information at the time of leaving the room is proper, the room leaving management apparatus 141 opens the door, and the user can leave the room.

In the sixth embodiment having the above-mentioned configuration, the room 100 corresponds to the facilities. The room entrance management apparatus 140 serves as the entrance management apparatus, and the room leaving management apparatus 141 serves as the leaving management apparatus. In addition, the access information to the cabinet 170 serves as the use permission information, and the PC 142 and the printer 143 serve as the management object and the use management apparatus.

The process in the sixth embodiment is same as the process of the fifth embodiment shown in FIG. 18, other than the above-mentioned point. Therefore, the explanation thereof is omitted.

[Seventh Embodiment]

A seventh embodiment is such a case that the cabinet is also used, similarly to the sixth embodiment. The schematic configuration of the use management system according to the seventh embodiment is shown in FIG. 21.

Figure 21:
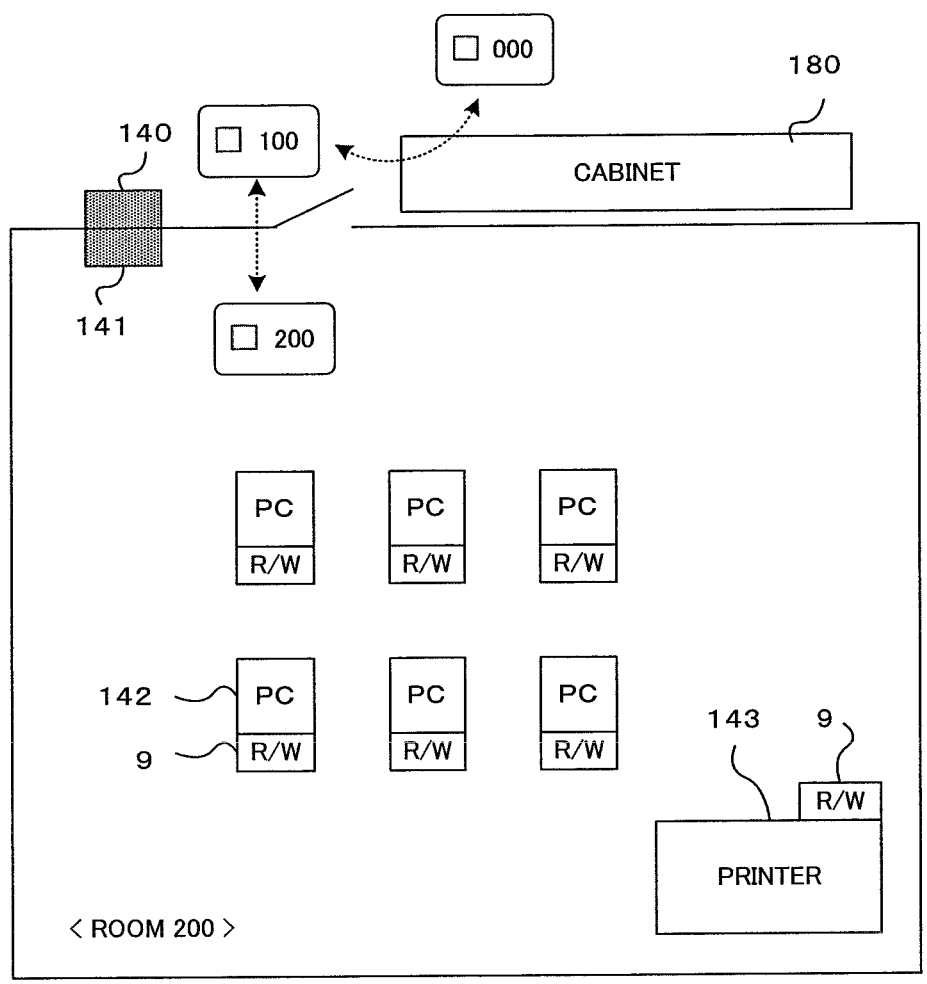
FIG. 21 is a schematic configuration diagram of the use management system of the electronics according to a seventh embodiment.

As shown in FIG. 21, the plural PCs 142 and the printer 143 are provided in a room 200, as the example of the electronics. The PC 142 basically has the same configuration as that of the PC 1 of the first embodiment shown in FIG. 5. The printer 143 basically has the same configuration as that of the printer 34 of the second embodiment shown in FIG. 9. The IC card reader/writer 9 having the configuration shown in FIG. 5 is provided in the PC 142 and the printer 143, respectively.

The room entrance management apparatus 140 having the same configuration as that of the room entrance management apparatus 130 of the fourth embodiment is provided out of the room 200, and the room leaving management apparatus 141 having the same configuration as that of the room leaving management apparatus 131 of the fourth embodiment is provided in the room 200.

Further, a cabinet 180 is arranged in the vicinity of the outer door of the room 200. The cabinet 180 is provided so that, before entering the room 200, the user stores a prohibited item therein. The prohibited items are a mobile phone and a portable terminal apparatus, for example. They are prescribed as the prohibited items in order to mainly prevent the information stored in the electronics in the room from being taken out. An item other than them can be prescribed as a prohibited item.

Figure 22:
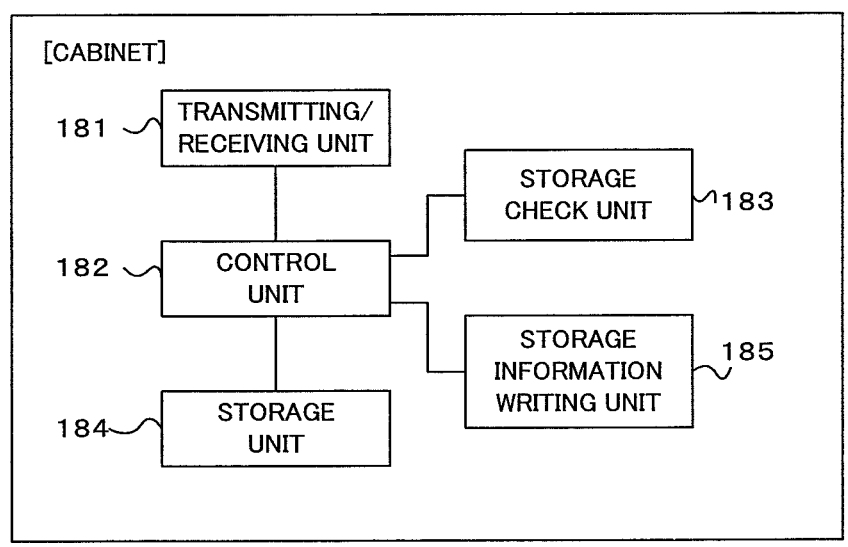
FIG. 22 is a functional block diagram of the cabinet shown in FIG. 21.

FIG. 22 shows the schematic configuration of the cabinet 180. As shown in FIG. 22, the cabinet 180 includes a transmitting/receiving unit 181, a control unit 182, a storage check unit 183, a storage unit 184 and a storage information writing unit 185. The transmitting/receiving unit 181 transmits and receives the information to and from the transmitting/receiving unit 88 of the IC card 3 by the radio transmission. The control unit 182 controls each component in the cabinet 180.

The storage checking unit 183 checks whether or not the prohibited item is stored into the cabinet 180. The concrete check method depends on a kind of prohibited item. For example, there is such a method that an image of the prohibited item defined by a company rule is pictured and recorded in advance, an image of an item stored into the storage portion is pictured by a compact camera provided in the storage portion of the cabinet 180 and image matching thereof is executed. Thereby, it can be checked whether or not the prohibited item defined in advance is securely stored in the cabinet 180. In addition, when the prohibited item is a communication equipment such as the mobile phone, the communication function is provided in the cabinet 180, and the identification information of the communication equipment is read by communicating with the communication equipment. In this manner, the check may be performed.

When the storage check unit 183 confirms that the prohibited item is securely stored in the cabinet 180, the storage information writing unit 185 writes the storage information onto the IC card 3. The storage information can include the storage date and time, the cabinet specifying information and the ID of the stored prohibited item (a registration number in such a case that the item is registered in the company in advance), for example.

In the seventh embodiment having the above-mentioned configuration, the room 200 corresponds to the facilities. The room entrance management apparatus 140 serves as the entrance management apparatus, and the room leaving management apparatus 141 serves as the leaving management apparatus. In addition, the storage information by the cabinet 180 serves as the use permission information, the PC 142 and the printer 143 serve as the management object and the use management apparatus.

Figure 23:
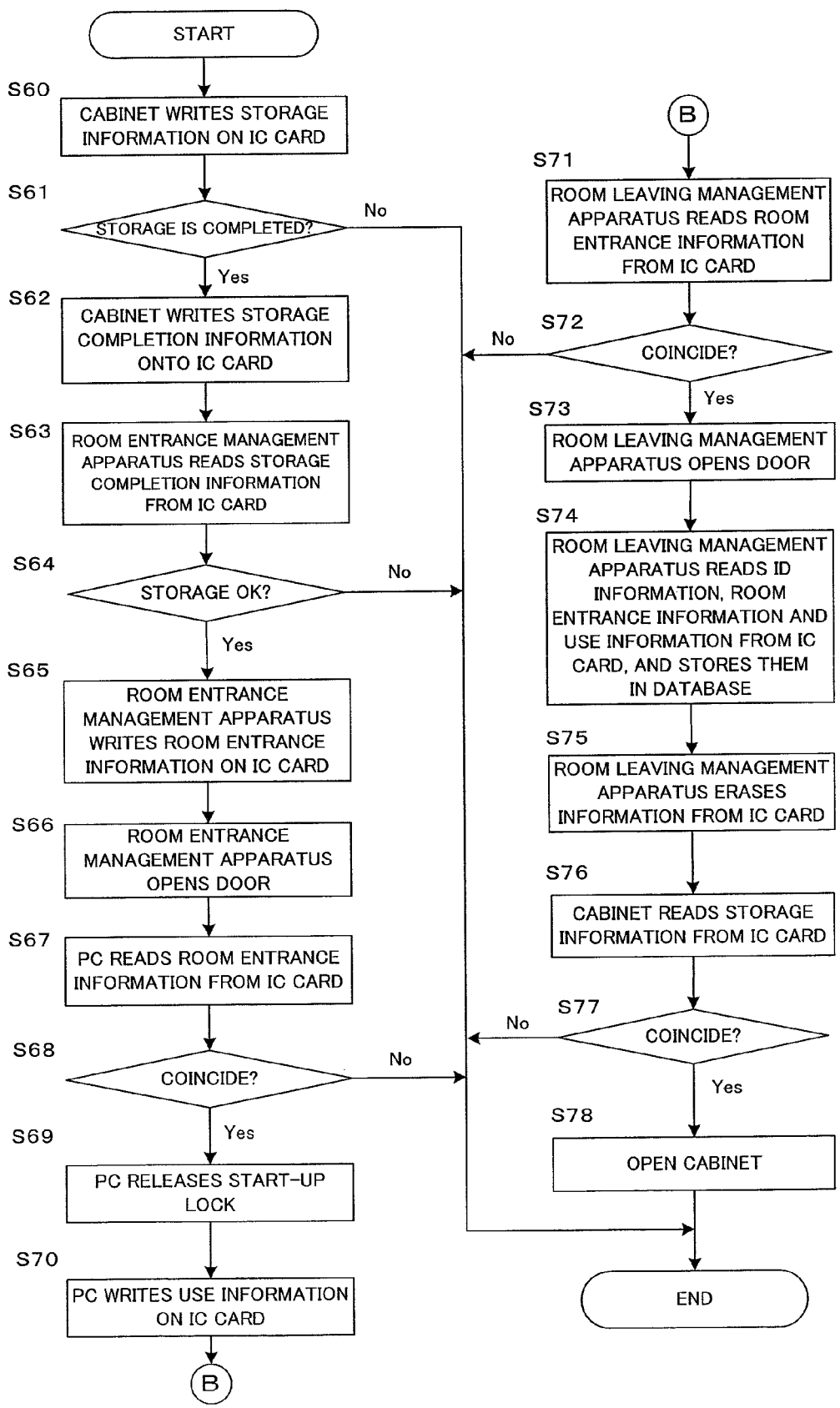
FIG. 23 is a flow chart of the process by the use management system of the electronics according to the seventh embodiment.

Next, a description will be given of a process in such a case that the user uses the system of the seventh embodiment. FIG. 23 is a flow chart of the process in the use management system of the seventh embodiment.

First, when the user sets the IC card 3 to the cabinet 180 and the prohibited item is stored in the cabinet 180, the storage information writing unit 185 writes the storage information onto the IC card 3 (step S60). Concretely, the storage date and time and the cabinet specifying information are written onto the IC card 3 as the storage information. Then, the storage check unit 183 performs the check (step S61). When the storage is completed, the storage check unit 183 writes storage completion information onto the IC card 3 (step S62).

Next, when the user puts the IC card 3 close to the room entrance management apparatus 140, the room entrance management apparatus 140 reads the storage completion information from the IC card 3 (step S63). When the storage completion information is not stored on the IC card 3 (step S64; No), the room entrance management apparatus 140 does not open the door, and the user cannot enter the room 200. Thereby, it can be prevented that the user having the prohibited item enters the room 200.

Meanwhile, when the storage completion information is stored on the IC card 3 (step S64; Yes), the room entrance management apparatus 140 writes the room entrance information onto the IC card (step S65) and opens the door (step S66). The room entrance information is prescribed as "200" being the room number of the room 200. Thereby, the user can enter the room 200.

When entering the room, the user puts the IC card 3 close to the IC card reader/writer 9 provided in the PC 142 in order to use the PC 142. The IC card reader/writer 9 reads the room entrance information from the IC card 3 (step S67). The collation room entrance information "200" is pre-stored in the storage unit of each of the PCs 142 in the room 200. The PC 142 collates the room entrance information (step S68). When they do not coincide with each other, the process ends. In this case, the user cannot use the PC 142. Meanwhile, when the room entrance information coincide with each other, the start-up lock of the PC 142 is released, and the PC 142 becomes available (step S69). Further, the PC 142 writes the use information on the IC card 3 (step S70).

When the user completes the work by using the PC 142, he or she puts the IC card 3 close to the room leaving management apparatus 141. The room leaving management apparatus 141 reads the room entrance information from the IC card 3 (step S71) and collates the read room entrance information with the collation room entrance information pre-stored in the room leaving management apparatus 141 (step S72). In this case, the room leaving management apparatus 141 stores the number "200" of the room 200 as the collation room entrance information. When the room entrance information do not coincide with each other, the room leaving management apparatus 141 does not open the door, and the user cannot exit the room. Meanwhile, when the room entrance information coincide with each other, the room leaving management apparatus 141 opens the door (step S73). Thereby, the user can leave the room 200. In addition, as need arises, the room leaving management apparatus 141 reads the ID information, the room entrance information and the use information of the equipment such as the PC from the IC card 3, and stores them in the PC use information database 33 as the history information (step S74). Moreover, as the need arises, the room leaving management apparatus 141 erases the room entrance information and the use information from the IC card 3 (step S75). The processes in steps S74 and S75 can be omitted.

Next, the user puts the IC card 3 close to the cabinet 180. The cabinet 180 reads the storage information from the IC card 3 (step S76) and collates the cabinet specifying information included in the storage information with its cabinet specifying information. When they coincide with each other, the cabinet 180 opens the door of the storage unit, and the user can take out the prohibited item stored therein. In this manner, the process ends.

(Modification)

In the above example, the cabinet 180 and the room entrance management apparatus 140 are separated. However, when they are connected via the LAN and communicate with each other, a process which will be described below can be executed. The cabinet 180 reads the ID information from the IC card 3 in step S60, and it writes the storage completion information on the IC card 3 in step S62. Afterward, the cabinet 180 transmits the ID information and the storage completion information to the room entrance management apparatus 140 via the LAN. When the user puts the IC card 3 close to the room entrance management apparatus 140, the room entrance management apparatus 140 reads the ID information and the storage completion information from the IC card 3 and collates them with the ID information and the storage completion information received from the cabinet 180 via the LAN. When the correspondent information coincide with each other, respectively, the room entrance management apparatus 140 opens the door. In this example, since the check by the room entrance management apparatus 140 is executed not only by the existence or nonexistence of the storage completion information but also by the collation (coincident confirmation) of the ID information and the storage completion information of the IC card, reliability of the check can be maintained.

[Eighth Embodiment]

Figure 24:
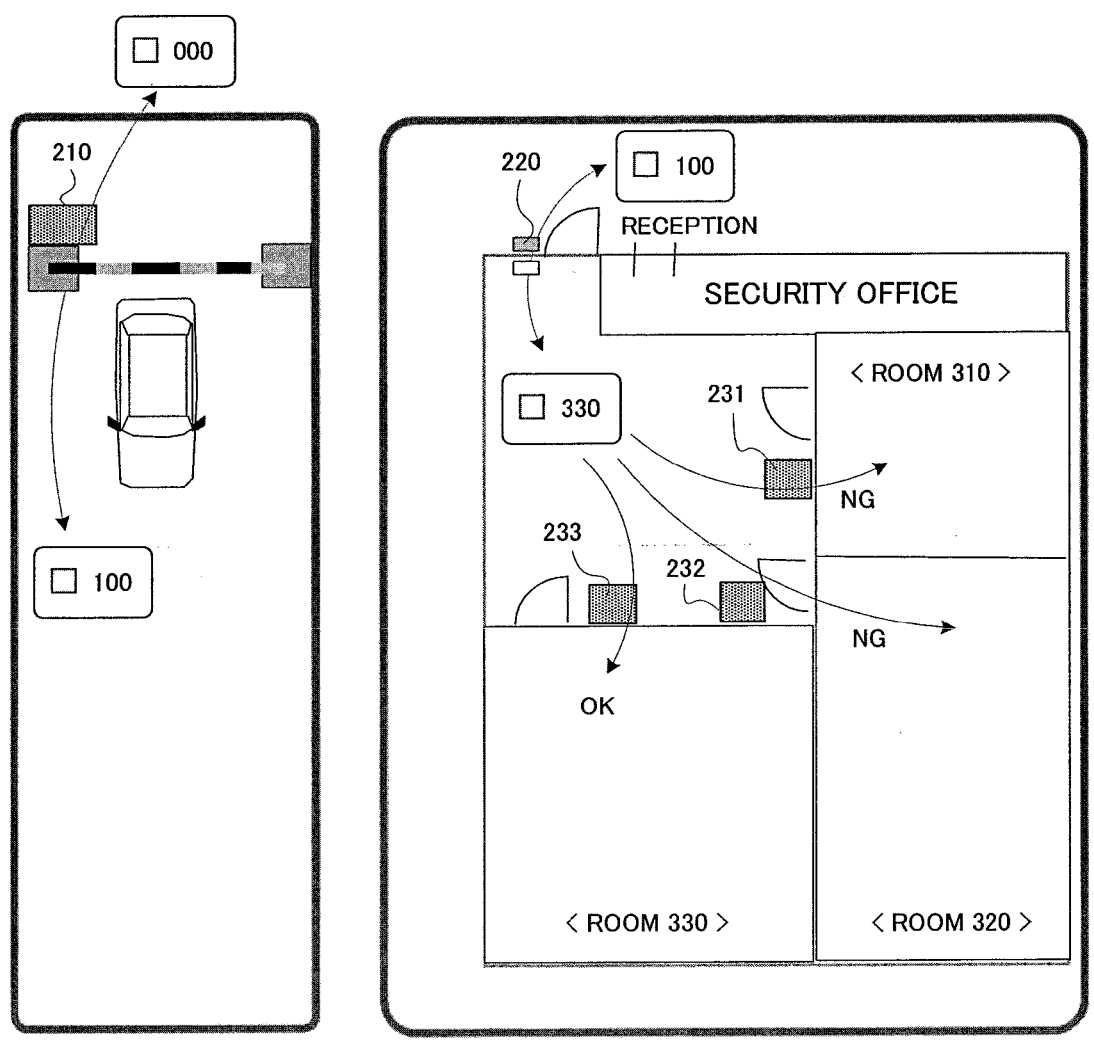
FIG. 24 is a schematic configuration diagram of an entrance management system according to an eighth embodiment.

An eighth embodiment is related to an entrance management system in which a gate apparatus in a parking area of a building and a room in the building are used. FIG. 24 shows the schematic configuration of the entrance management system of this embodiment.

Figure 25A:
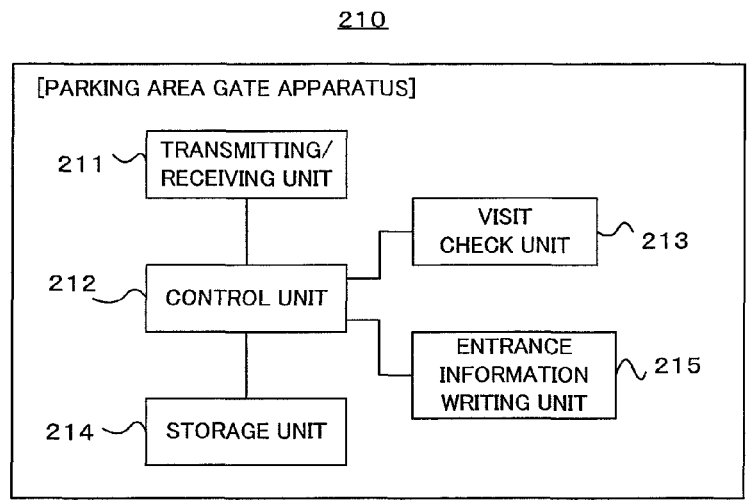
FIGS. 25A to 25C are functional block diagrams of a parking area gate apparatus, a reception management apparatus and a room entrance management apparatus shown in FIG. 24.

As shown in. FIG. 24, a parking area gate apparatus 210 is provided in the parking area neighboring to the building. FIG. 25A shows the configuration of the parking area gate apparatus 210. The parking area gate apparatus 210 includes a transmitting/receiving unit 211, a control unit 212, a visit check unit 213, a storage unit 214 and an entrance information writing unit 215. The transmitting/receiving unit 211 transmits and receives the information to and from the transmitting/receiving unit 88 of the IC card 3 by the radio transmission. The control unit 212 controls each component in the parking area gate apparatus 210.

The entrance information writing unit 215 writes the entrance information on the IC card when the user enters the parking area. The visit check unit 213 checks whether or not the visit completion information is stored on the IC card 3 when the user leaves the parking area. When the visit completion information is stored, the parking area gate apparatus 210 opens the gate.

The building has a reception and rooms 310 to 330. A reception management apparatus 220 is provided at the reception. In addition, entrance management apparatuses 231 to 233 are provided at the entrances of the rooms 310 to 330, respectively. Without passing through the receptions, the user cannot structurally go to the rooms 310 to 330.

Figure 25B:
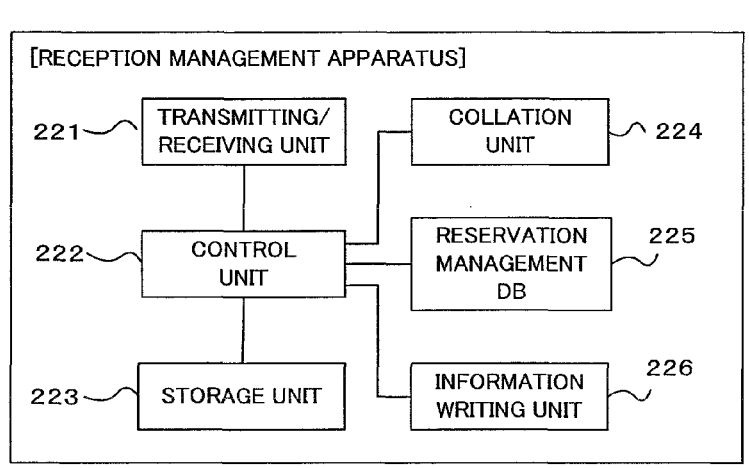

FIG. 25B shows a schematic configuration of the reception management apparatus 220. The reception management apparatus 220 includes a transmitting/receiving unit 221, a control unit 222, a storage unit 223, a collation unit 224, a reservation management database (DB) 225 and an information writing unit 226. The transmitting/receiving unit 221 transmits and receives the information to and from the transmitting/receiving unit 88 of the IC card 3 by the radio transmission. The control unit 222 controls each component in the reception management apparatus 220.

The reservation management DB 225 stores the information of the room reserved by the user, in correspondence with the ID information stored on the IC card of the user. When the user leaves the room, the collation unit 224 reads the IC information and the visit completion information from the IC card 3 and checks whether or not the user visits the reserved room, with reference to the reservation management DB 225. In addition, the storage unit 223 associates the visit information and the visit completion information generated by the visit of the user with the ID information of the user, and stores them as the history information.

Figure 25C:
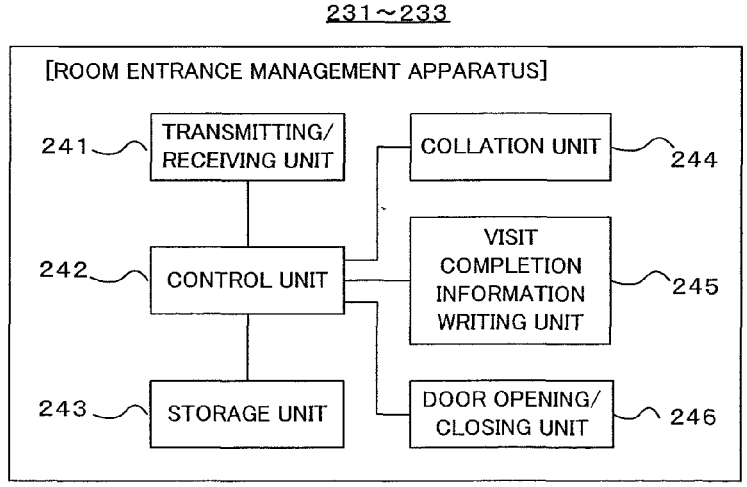
Figure 26:
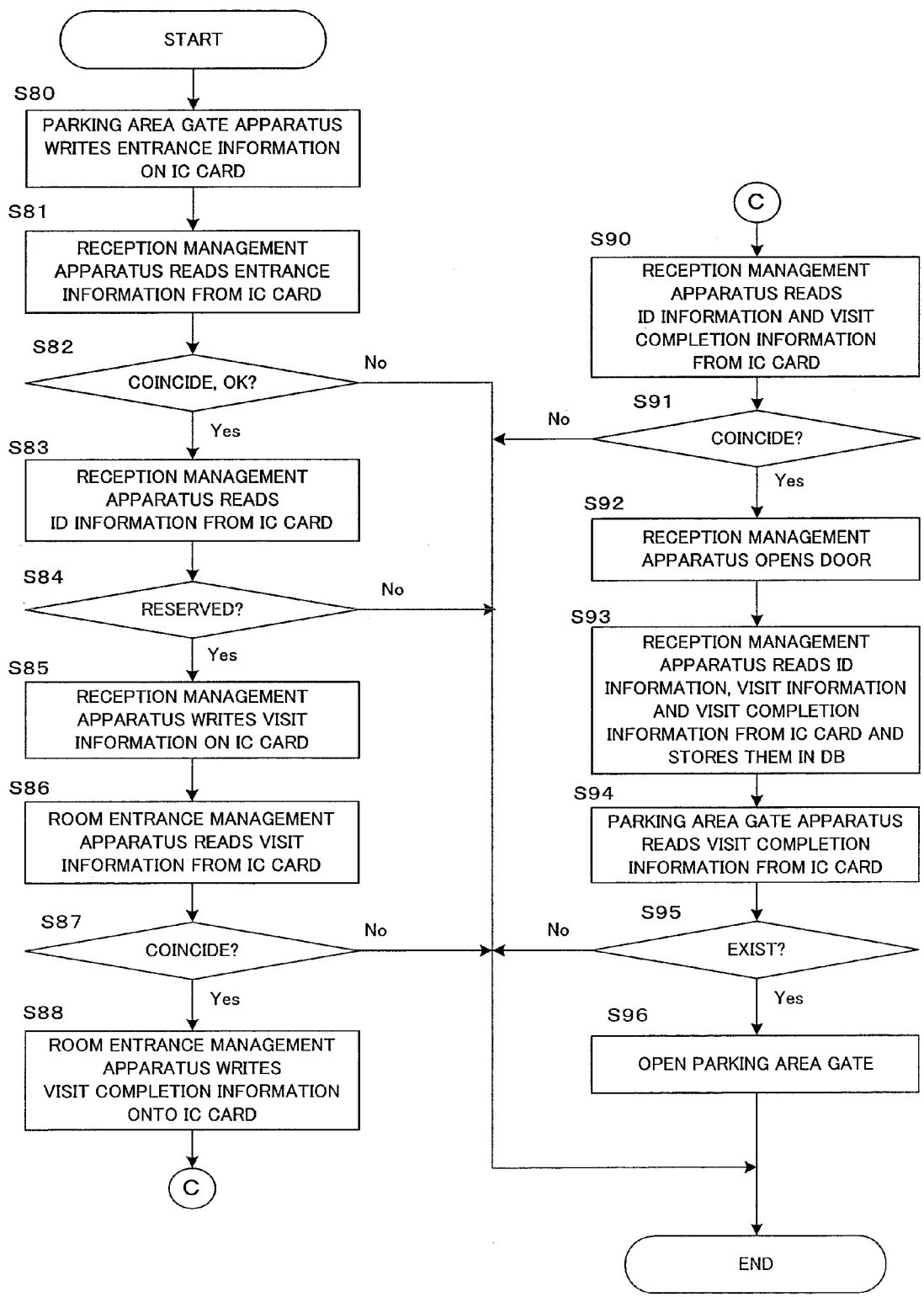
FIG. 26 is a flow chart of the process by the room entrance management system according to the eighth embodiment.

The room entrance management apparatuses 231 to 233 provided at the entrance of each of the rooms executes management so that the user can enter the only room that he or she has reserved in advance. FIG. 25C shows the configuration of the room entrance management apparatuses 231 to 233. Each of the room entrance management apparatuses 231 to 233 includes a transmitting/receiving unit 241, a control unit 242, a storage unit 243, a collation unit 244, a visit completion information writing unit 245 and a door opening/closing unit 246.

The transmitting/receiving unit 241 transmits and receives the information to and from the transmitting/receiving unit 88 of the IC card 3 by the radio transmission. The control unit 242 controls each component in each of the room entrance management apparatuses 231 to 233. The storage unit 243 stores the collation room entrance information corresponding to each of the rooms. In this embodiment, the room number is used as the room entrance information. Thus, the collation room entrance information "310" is stored in the storage unit 243 of the room entrance management apparatus 231 provided in the room 310. Similarly, the collation room entrance information "320" is stored in the storage unit 243 of the room entrance management apparatus 232, and the collation room entrance information "330" is stored in the storage unit 243 of the room entrance management apparatus 233.

When the user enters the room, the collation unit 244 collates the room entrance information stored on the IC card with the collation room entrance information stored in the storage unit 243. Only when they coincide with each other, the visit completion information writing unit 245 stores the visit completion information on the IC card 3. In this embodiment, the visit completion information is the room number visited by the user. In addition, only when the collation unit 244 determines that the room entrance information coincide with each other, the door opening/closing unit 246 operates, and each room door is opened.

In the eighth embodiment having the above-mentioned configuration, the floor including the rooms 310 to 330 corresponds to the facilities. Each of the rooms 310 to 330 serves as the management object, and the room entrance management apparatuses 231 to 233 serve as the use management apparatuses. The reception management apparatus 220 serves as the entrance management apparatus and the leaving management apparatus. Additionally, the visit information serves as the use permission information, and the visit completion information serves as the use information.

Next, a description will be given of the process of the system according to this embodiment by the user. FIG. 23 is a flow chart of the process of the entrance management system of this embodiment.

First, when the user on a vehicle enters the parking area and puts the IC card 3 close to the parking area gate apparatus 210, the parking area gate apparatus 210 writes the entrance information on the IC card 3 (step S80). In an example shown in FIG. 24, the entrance information is prescribed as "100". The entrance information may be the flag showing the existence or nonexistence of the entering and the identification information of the parking area. In addition, the entrance information may include the entrance date and time, too.

Next, when the user parks the vehicle and puts the IC card 3 close to the reception management apparatus 220 at the reception, the reception management apparatus 220 reads the entrance information from the IC card 3 (step S81) and check it (step S82). When the entrance information is not proper, the user cannot enter the inside (i.e., each of the rooms) from the reception. Meanwhile, when the entrance information is proper, the reception management apparatus 220 reads the ID information from the IC card 3 (step S83) and refers to the reservation management DB 225 to determine whether or not the user completes the use reservation of the specific room (step S84). When the room is not reserved, the user cannot use the room. Meanwhile, when the room is reserved, based on the reserved contents, the reception management apparatus 220 writes the visit information onto the IC card 3 (step S85). In this embodiment, the visit information is prescribed as the room number. Namely, when the user having the ID information makes the use reservation of the room 330, the information writing unit 226 of the reception management apparatus 220 writes the room number "330" on the IC card 3, as the visit information.

Afterward, the user goes to the entrance of the visiting room and puts the IC card 3 close to the room entrance management apparatus provided there. The room entrance management apparatus reads the visit information from the IC card 3 (step S86) and determines whether or not it coincides with the visit information corresponding to the room (step S87). When they do not coincide with each other, the user cannot enter the room. Meanwhile, when they coincide with each other, the visit completion information writing unit 245 of the room entrance management apparatus writes the visit completion information on the IC card 3 (step S88), and the door opening/closing unit 246 opens the room door. Thereby, the user can enter the reserved room. In the above embodiment, the room 330 is the visiting place, and the room number "330" is stored on the IC card 3 as the visit information. Thus, the room entrance management apparatus 233 provided at the entrance of the room 330 collates the visit information read from the IC card 3 with the collation visit information pre-stored in the storage unit 243. Since they coincide with each other, the user can enter the room 330. However, in this case, the user cannot enter the rooms 310 and 320. The visit completion information may be the room number, or the room number and the predetermined flag, for example.

When the user completes the use of the room and leaves the room, he or she puts the IC card 3 close to the reception management apparatus 220. The reception management apparatus 220 reads the ID information and the visit completion information from the IC card 3 (step S90). Then, the reception management apparatus 220 refers to the reservation management DB 225 and checks whether or not the visit completion information read from the IC card is the visit completion information corresponding to the room reserved by the user (step S91). When they coincide with each other, the reception management apparatus 220 opens the door of the reception (step S92). In addition, as need arises, the reception management apparatus 220 reads the ID information, the visit information and the visit completion information from the IC card 3 and stores them in the storage unit 223 as the history information (step S93).

Next, the user gets on the vehicle at the parking area and puts the IC card 3 close to the parking area gate apparatus 210. The parking area gate apparatus 210 reads the visit completion information from the IC card 3 (step S94) and checks it (step S95). When the proper visit completion information is stored onto the IC card 3, the parking area gate apparatus 210 opens the gate (step S96). Thereby, the user can go out of the parking area.

(Modification)

In the above-mentioned example, unless the user reserves the room in advance, he or she cannot structurally use the room. By this configuration, arrangement of the reception management apparatus 220 enables the reception without any person. However, in such a situation that the use of the room should be permitted to the user making no reservation, the receptionist can operate the reception management apparatus 220 at the reception to reserve the room. The reservation information is stored in the reservation management DB of the reception management apparatus 220, and subsequently, the reception management apparatus 220 executes the same process as described above.

In addition, in the above embodiment, the present invention is applied to the entrance management system in the surroundings including the gate apparatus in the parking area and the room in the building. However, the present invention can be applied to surroundings other than this. For example, the present invention may be applied to a system which uses the gate apparatus in the parking area and a cash register in a department store. Generally, there is known such a service that no parking fee is required for a customer who pays money equal to or larger than the predetermined money for items. Thus, purchased money amount data may be stored onto the IC card at the cash register in the store, and the amount may be checked with using the parking area gate apparatus at the time of leaving of the parking area. When the purchased money amount data larger than the predetermined money amount is stored on the IC card, the parking area gate apparatus opens the gate at no fee. Instead of storing the purchased money amount data, only the flag showing whether or not the parking fee is required may be stored on the IC card, and the parking area gate apparatus may check it.

[Ninth Embodiment]

Figure 27:
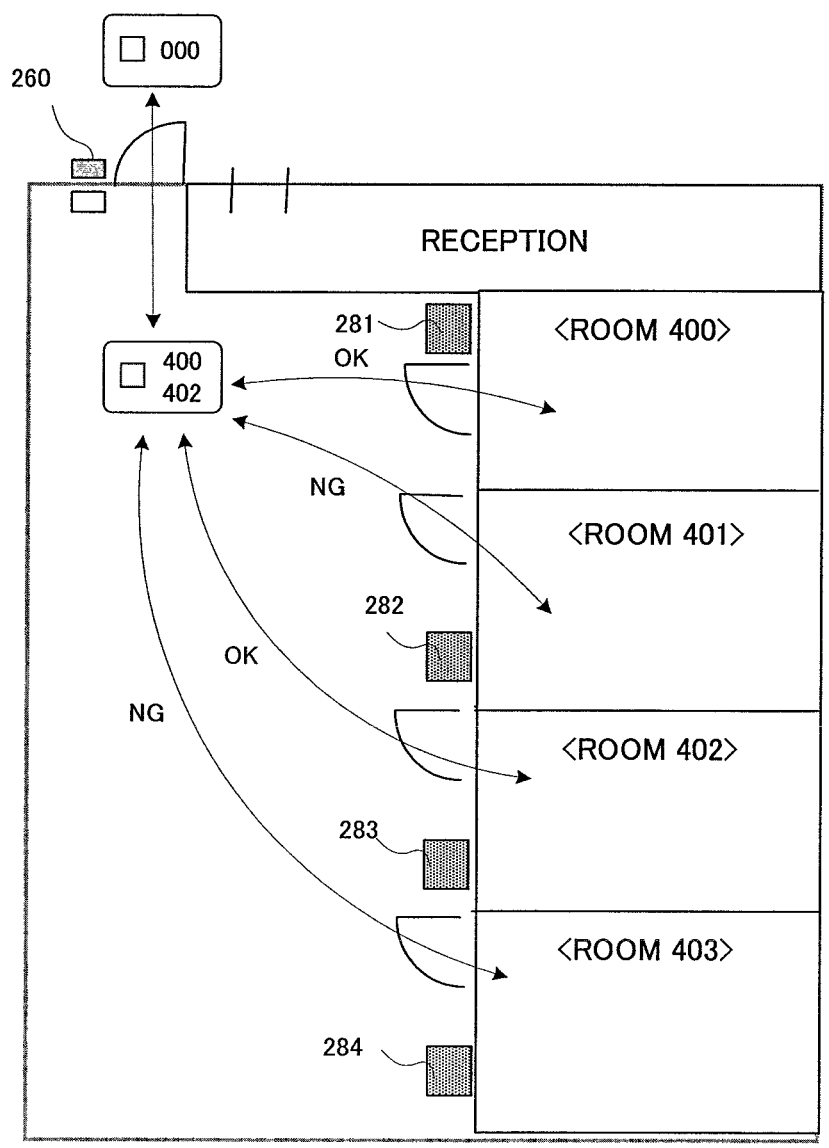
FIG. 27 is a schematic configuration diagram of a visit management system according to a ninth embodiment.

A ninth embodiment is such a case that the present invention is applied to the visit management systems of plural rooms. FIG. 27 shows a schematic configuration of the visit management system according to this embodiment.

As shown in FIG. 27, there are plural rooms 400 to 403 on a floor of a certain building. The reception is provided at the entrance of the floor. Unless the user passes through the reception, he or she cannot structurally go to each of the rooms 400 to 403. A reception management apparatus 260 is provided at the reception. In addition, room entrance management apparatuses 281 to 284 are provided in each of the rooms.

Figure 28A:
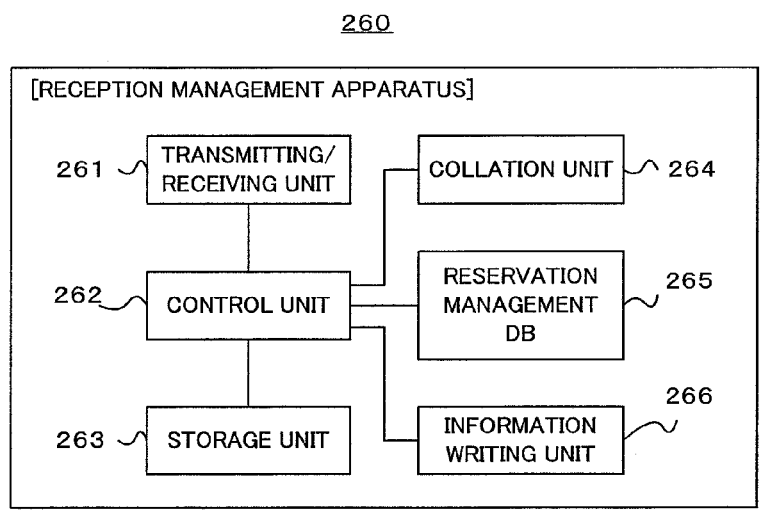
FIGS. 28A and 28B are functional block diagrams of the reception management apparatus and the room entrance management apparatus shown in FIG. 27.

FIG. 28A shows a schematic configuration of the reception management apparatus 260. The reception management apparatus 260 includes a transmitting/receiving unit 261, a control unit 262, a storage unit 263, a collation unit 264, a reservation management DB 265 and an information writing unit 266. The transmitting/receiving unit 261 transmits and receives the information to and from the transmitting/receiving unit 88 of the IC card 3 by the radio transmission. The control unit 262 controls each component in the reception management apparatus 260.

The reservation management DB 265 stores the information of the predetermined room which the user should visit by corresponding it with the ID information stored on the IC card of the user. When the user leaves the room, the collation unit 264 reads the ID information and the visit completion information from the IC card 3 and refers to the reservation management DB 265 to check whether or not the user visits all the rooms to visit. In addition, the storage unit 263 stores the visit information and the visit completion information generated by the visit of the user as the history information by associating them to the ID information of the user.

Figure 28B:
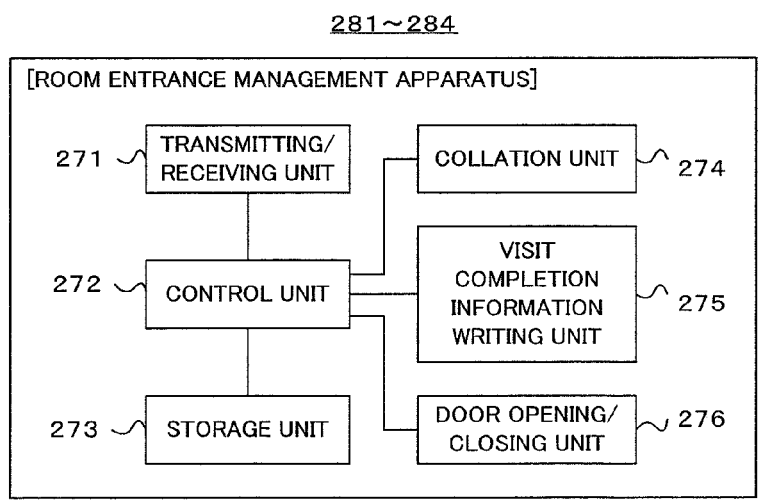

The room entrance management apparatuses 281 to 284 provided at the entrance of each of the rooms execute such management that the user can enter only the predetermined room. FIG. 28B shows a schematic configuration of the room entrance management apparatuses 281 to 284. The room entrance management apparatuses 281 to 284 include a transmitting/receiving unit 271, a control unit 272, a storage unit 273, a collation unit 274, a room entrance information writing unit 275 and a door opening/closing unit 276.

The transmitting/receiving unit 271 transmits and receives the information to and from the transmitting/receiving unit 88 of the IC card 3 by the radio transmission. The control unit 272 controls each component in each of the room entrance management apparatuses 281 to 284. The storage unit 273 stores the collation room entrance information corresponding to each of the rooms. In this embodiment, the room number is used as the room entrance information. Thus, the collation room entrance information "400" is stored in the storage unit 273 of the room entrance management apparatus 281 provided in the room 400. Similarly, collation room entrance information "401", "402" and "403" are stored in the storage unit 273 of the room entrance management apparatuses 282, 283 and 284, respectively.

The collation unit 274 collates the room entrance information stored on the IC card with the collation room entrance information stored in the storage unit 273 when the user enters the room. Only when they coincide with each other, the visit completion information storage unit 275 stores the visit completion information on the IC card 3. In this embodiment, the visit completion information is prescribed as the room number of the visiting room. Additionally, only when the collation unit 274 determines that the room entrance information coincide with each other, the door opening/closing unit 276 operates, and each room door is opened.

In the ninth embodiment having the above-mentioned configuration, the floor including the rooms 400 to 403 corresponds to the facilities. Each of the rooms 400 to 403 serves as the management object, and the room entrance management apparatuses 281 to 284 serve as the use management apparatuses. The reception management apparatus 220 serves as the entrance management apparatus and the leaving management apparatus. In addition, the visit information serves as the use permission information, and the visit completion information serves as the use information.

Next, a description will be given of the process in such a case that the user uses the system in this embodiment. FIG. 29 is a flow chart of the process of the visit management system of this embodiment.

First, when the user puts the IC card 3 close to the reception management apparatus 260 at the reception, the reception management apparatus 260 reads the ID information from the IC card 3 (step S111) and refers to the reservation management DB 265 to check the existence or nonexistence of the reservation information of the user (step S112). When the reservation information of the user does not exist, the user cannot visit the room. Meanwhile, when the reservation information exists, based on the contents, the reception management apparatus 260 writes the visit information on the IC card 3 (step S113). In this embodiment, the room number is the visit information. Namely, when the rooms which the user having the ID information should visit are the rooms 400 and 402, the information writing unit 266 of the reception management apparatus 260 writes the room numbers "400" and "402" on the IC card 3 as the visit information.

Afterward, the user goes to the entrance of the visit room and puts the IC card close to the room entrance management apparatus provided there. The entrance management apparatus reads the visit information from the IC card 3 (step S114) and determines whether or not it coincides with the visit information corresponding to the room (step S115). When they do not coincide with each other, the user cannot enter the room. Meanwhile, when they coincide with each other, the visit completion information writing unit 275 of the room entrance management apparatus stores the visit completion information on the IC card 3, and the door opening/closing unit 276 opens the room door. In the above example, the rooms 400 and 402 are the visit rooms, and the room numbers "400" and "402" are stored on the IC card 3 as the visit information. Thus, the user can enter the rooms 400 and 402, but he or she cannot enter the rooms 401 and 403. The visit completion information can be the room number, or the room number and the predetermined flag.

The user visits all the rooms to visit. When leaving the rooms, the user puts the IC card 3 close to the reception management apparatus 260. The reception management apparatus 260 reads the ID information and the visit completion information from the IC card 3 (step S117). Then, the reception management apparatus 260 refers to the reservation management DB 265 and checks whether or not the visit completion information read from the IC card includes the visit completion information corresponding to all the rooms that the user should visit (step S118). When the visit completion information of all the visit rooms is stored on the IC card, the reception management apparatus 260 opens the door of the reception (step S119). As the need arises, the reception management apparatus 260 reads the ID information, the visit information, the visit completion information from the IC card 3 and stores them in the storage unit 263 as the history information (step S120). Meanwhile, when the visit completion information of all the visit rooms is not stored on the IC card 3, the door is not opened. In this case, the reception management apparatus 260 may display such a massage that the visit room of the user is left and may reproduce a sound message. Afterwards, since the user visits the left room, the process returns to step S114.

In this embodiment, the user can enter only the predetermined room. Unless the user visits all the rooms to visit, he or she cannot pass through the reception to go out. This system can be preferably applied to a health check, for example. Namely, the room corresponding to the check item predetermined for each user is prescribed as the visit information, which is associated with the ID information of the user to be stored in the reservation management DB 265. When the user forgets the check in a certain room and goes home, the reception management apparatus 260 can check the visit completion information on the IC card and find out the unchecked item.

(Modification)

Conversely, the present invention can be applied to such a system that only a room entrance permission of plural rooms is given to the user. For example, in FIG. 27, it is prescribed that a room 400 is a break room and the rooms 401 to 403 are conference rooms. As for the user making a conference reservation of the conference room 401, the reception management apparatus 260 stores the visit information of only the conference room 401 and the break room 400 on the IC card. Thereby, the user can enter only the conference room 401 in which the conference of his or hers is held and the break room 400, but he or she cannot enter the other conference rooms. In this case, when the user leaves the rooms, the reception management apparatus 260 may collate the existence or nonexistence of the visit information to open the door, without collating the visit completion information. Instead, when the user leaves the room, the reception management apparatus 260 may exclude the break room 400 from the objects of the collation process of the visit completion information.

In the above embodiment, once the user enters the room to visit, the visit completion information is stored on the IC card. When the user leaves the room, the reception management apparatus 260 determines whether or not the visit completion information corresponding to all the visit rooms exists. Instead, when the user passes through the reception at the beginning, the reception management apparatus 260 may store the visit information on the IC card, and when the user visits each of the rooms, the room entrance management apparatus may erase the correspondent visit information from the IC card. In this case, if the user appropriately visits all the visit rooms, all the visit information is erased when the user passes through the reception management apparatus 260 on his or her way home. Thereby, it can be confirmed that the user visits all the visit rooms.

[Modification]

In the above embodiments, such an example that the non-contact IC card is used as the storage medium is shown, but the application of the present invention is not limited to this. Namely, if the ID information is pre-stored, the ID information can be read by the reader/writer and the use permission information such as the room entrance information, the entrance information and the visit information can be written and stored thereon by the reader/writer, other storage medium such as a known contact-type card storage medium may be used.

INDUSTRIAL APPLICABILITY

This invention provides such a method that the use management of the equipment, the limit of illegal use, the room entrance management, the entrance management and the visit management are executed with using the storage medium such as the IC card. Therefore, this invention can be used for various kinds of management, such as the use management of the company equipment and the security management of the building.

The invention claimed is:
1. A management system which uses an information storage medium of a user to manage use of a management object provided in a facility, wherein the information storage medium stores an identification information of the user, the system comprising:
   an entrance management apparatus, provided in a vicinity of an entrance of the facility, which writes use permission information for permitting the use of the management object onto the information storage medium when the user enters the facility;
   wherein the entrance management apparatus includes:
      a storage unit which stores collation identification information indicating the user permitted to enter the facility;
      a transmitting/receiving unit which reads the identification information of the user from the information storage medium; and
      a collation unit which collates the identification information read from the information storage medium with the collation identification information, and enables the user to enter the facility when the identi- fication information read from the information storage medium coincides with the collation identification information;

a use management apparatus, provided for each management object, which controls availability or unavailability of the management object based on the use permission information stored on the information storage medium, and which writes, on the information storage medium, use information indicating that the management object is used, the use information including identification information of the management object used by the user; and a leaving management apparatus, provided in a vicinity of an exit of the facility, which manages leaving of the user based on the use information, stored on the information storage medium, when the user leaves the facility, wherein the leaving management apparatus includes:
a database;
a door-opening unit which opens a door based on the use information stored in the information storage medium;
a storing unit which associates the use information stored on the information storage medium with the identification information of the user and stores the identification information of the user and the use information into the database; and
an erasing unit which erases the use permission information and the use information stored on the information storage medium to return the information storage medium to a state before the use permission information and the use information are written, when the user leaves the facility.

2. An entrance/leaving management apparatus which includes a database and uses an information storage medium of a user to manage use of a management object provided in a facility and manage entrance/leaving of the user, wherein the information storage medium stores an identification information of the user, the apparatus comprising:

a first writing unit, provided in a vicinity of an entrance of the facility, which writes use permission information, via a transmitting/receiving unit of the first writing unit, for permitting the use of the management object onto the information storage medium when the user enters the facility; wherein the first writing unit includes: a storage unit which stores collation identification information indicating the user permitted to enter the facility; the transmitting/receiving unit which reads the identification information of the user from the information storage medium; and a collation unit which collates the identification information read from the information storage medium with the collation identification information, and enables the user to enter the facility when the identification information read from the information storage medium coincides with the collation identification information;

a second writing unit, provided for each management object, which writes use information, indicating that the management object is used, onto the information storage medium when the user uses the management object, the use information including identification information of the management object used by the user; wherein the second writing unit controls the availability or unavailability of the management objected based on the use permission information stored on the information storage medium;

a door-opening unit which opens a door based on the identification information of the user stored on the information storage medium when the user enters the facility and opens the door based on the use information stored on the information storage medium when the user leaves the facility; and an erasing unit which stores the use information into the database in association with the identification information of the user and erases the use permission information and the use information at the same time from the information storage medium to return the information storage medium to a state before the use permission information and the use information are written, when the user leaves the facility.

3. An entrance/leaving management method executed by an entrance/leaving management apparatus which includes a database and uses an information storage medium of a user to manage use of a management object provided in a facility and manage entrance/leaving of the user, wherein the information storage medium stores an identification information of the user, the method comprising:

a first writing process, performed by a first writing unit provided in a vicinity of an entrance of the facility, which writes use permission information, via a transmitting/receiving unit of the first writing unit, for permitting the use of the management object onto the information storage medium when the user enters the facility; wherein the first writing unit includes: a storage unit which stores collation identification information indicating the user permitted to enter the facility; the transmitting/receiving unit which reads the identification information of the user from the information storage medium; and a collation unit which collates the identification information read from the information storage medium with the collation identification information, and enables the user to enter the facility when the identification information read from the information storage medium coincides with the collation identification information;

a second writing process, performed by a second writing unit provided for each management object, which stores use information, indicating that the management object is used, onto the information storage medium when the user uses the management object, the use information including identification information of the management object used by the user; wherein the second writing unit controls the availability or unavailability of the management objected based on the use permission information stored on the information storage medium;

a door-opening process which opens a door based on the identification information of the user stored on the information storage medium when the user enters the facility and opens the door based on the use information stored on the information storage medium when the user leaves the facility; and an erasing process which stores the use information into the database in association with the identification information of the user and erases the use permission information and the use information at the same time from the information storage medium to return the information storage medium to a state before the use permission information and the use information are written, when the user leaves the facility.

* * * * *